United States Patent
Eto et al.

(10) Patent No.: US 12,098,669 B2
(45) Date of Patent: Sep. 24, 2024

(54) TWO-STROKE ENGINE

(71) Applicant: YAMABIKO CORPORATION, Tokyo (JP)

(72) Inventors: Kuniyoshi Eto, Tokyo (JP); Shirou Yamaguchi, Tokyo (JP); Takuo Yoshizaki, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 18/020,269

(22) PCT Filed: May 21, 2021

(86) PCT No.: PCT/JP2021/019478
§ 371 (c)(1),
(2) Date: Feb. 8, 2023

(87) PCT Pub. No.: WO2022/049839
PCT Pub. Date: Mar. 10, 2022

(65) Prior Publication Data
US 2023/0265781 A1  Aug. 24, 2023

(30) Foreign Application Priority Data
Sep. 1, 2020 (JP) .................... 2020-147057

(51) Int. Cl.
*F02B 19/12* (2006.01)
*F02B 25/16* (2006.01)
*F02B 33/04* (2006.01)

(52) U.S. Cl.
CPC .............. *F02B 19/12* (2013.01); *F02B 25/16* (2013.01); *F02B 33/04* (2013.01); *F02B 2710/036* (2013.01)

(58) Field of Classification Search
CPC ........... F02B 19/12; F02B 25/16; F02B 33/04
See application file for complete search history.

(56) References Cited

U.S. PATENT DOCUMENTS 4,072,136 A * 2/1978 Noguchi ............. F02B 19/1066
    123/274
4,317,432 A * 3/1982 Noguchi ................ F02B 33/24
    123/1 R
(Continued)

FOREIGN PATENT DOCUMENTS

JP    S50-38764 B    12/1974
JP    S52148710 A    12/1977
(Continued)

OTHER PUBLICATIONS

International Search Report issued in corresponding International Patent Application No. PCT/JP2021/019478 mailed Jul. 6, 2021 (2 pages).
(Continued)

*Primary Examiner* — Logan M Kraft
*Assistant Examiner* — Johnny H Hoang
(74) *Attorney, Agent, or Firm* — Kilyk & Bowersox, P.L.L.C.

(57) ABSTRACT

A two-stroke engine according to the present invention includes: a separating wall which confines a tip end portion of an ignition device; an ignition promoting chamber which is formed by means of the separating wall, is independent of a combustion chamber, and encloses the tip end portion of the ignition device; and a plurality of communicating holes which are provided in the separating wall, each of which is provided with a first opening that opens in the combustion chamber and a second opening that opens in the ignition promoting chamber, and which provide communication between the combustion chamber and the ignition promoting chamber.

13 Claims, 26 Drawing Sheets

(56) References Cited

U.S. PATENT DOCUMENTS

| | | | |
|---|---|---|---|
| 6,338,327 B1 | 1/2002 | Ogi et al. | |
| 7,278,382 B1* | 10/2007 | Kyuma | F02B 25/14 |
| | | | 123/193.2 |
| 2011/0079206 A1 | 4/2011 | Yamazaki et al. | |
| 2012/0024276 A1* | 2/2012 | Koga | F02B 25/14 |
| | | | 123/73 PP |
| 2014/0299099 A1* | 10/2014 | Yoshizaki | F02M 7/133 |
| | | | 123/438 |
| 2019/0226387 A1* | 7/2019 | Hayakawa | F02P 23/04 |
| 2019/0288488 A1* | 9/2019 | Niessner | H01T 21/02 |
| 2021/0079874 A1* | 3/2021 | Berger | F02M 21/0296 |
| 2021/0270204 A1* | 9/2021 | Svensson | F16J 9/00 |

FOREIGN PATENT DOCUMENTS

| | | |
|---|---|---|
| JP | H05-222935 A | 8/1993 |
| JP | 2000-248941 A | 9/2000 |
| JP | 2001-73779 A | 3/2001 |
| JP | 2009-224345 A | 10/2009 |
| JP | 2011-099404 A | 5/2011 |
| JP | 2012-047050 A | 3/2012 |
| JP | 2013-113096 A | 6/2013 |

OTHER PUBLICATIONS

Office Action issued in corresponding Japanese Patent Application No. 2020-147057 issued Dec. 11, 2023 (9 pages)(with English translation).

\* cited by examiner

TWO-STROKE ENGINE

This application is a National Stage Application of PCT/JP2021/019478, filed May 21, 2021, which claims priority to Japanese Patent Application No. 2020-147057, filed Sep. 1, 2020.

FIELD OF THE INVENTION

The present invention relates to a two-stroke engine, and, more particularly, to an engine of crankcase compression type in which intake gas is pre-compressed in a crankcase to supply the pre-compressed intake gas through scavenging passages to a combustion chamber.

BACKGROUND OF THE INVENTION

Due to the reduced size and weight, the two-stroke engine is prevailing as a power source for work machines, e.g. handheld work machines such as a brush cutter and a chainsaw. A currently most prevailing two-stroke engine is a crankcase compression type engine. That is, in the crankcase compression type engine, air-fuel mixture is pre-compressed in the crankcase so that in a scavenging stroke, the pre-compressed air-fuel mixture is supplied through the scavenging passages to the combustion chamber, to scavenge the combustion chamber. Since air-fuel mixture is used for scavenging in this way, the two-stroke engine involves a so-called "blow-by" problem that air-fuel mixture is exhausted in the scavenging stroke. To improve this "blow-by" problem, a stratified scavenging engine has been developed (Patent Document 1) that forms an air layer between burnt gas and air-fuel mixture, by supplying leading air that includes fresh air not containing fuel or lean air-fuel mixture, to the combustion chamber prior to supply of air-fuel mixture to the combustion chamber in the scavenging stroke. The stratified scavenging engine has already been put into practical use and is mounted on a lot of work machines.

The two-stroke engine has a problem that burnt gas remains in the combustion chamber. Amount of this remaining burnt gas is not constant from cycle to cycle. This induces a fundamental problem of the two-stroke engine that the ignitability of air-fuel mixture becomes worse in a cycle in which the amount of burnt gas is large. A typical example arising from this problem is irregular combustion during low load operation. Occurrence of irregular combustion brings about an emission problem due to increased concentration of unburnt components in exhaust gas.

Not limited to four-stroke engines, the two-stroke engines also undergo development of electronic control, particularly, technical development for optimizing air-fuel ratio.

Patent Document 2 proposes a two-stroke engine ensuring the certainty of ignition even for air-fuel mixture having a relatively lean air-fuel ratio. This two-stroke engine includes a pre-chamber formed in a cylinder head. A carburetor has a main passage that generates relatively lean air-fuel mixture and a second passage that generates rich air-fuel mixture. Relatively lean air-fuel mixture generated in the main passage of the carburetor is supplied as intake gas through a main air-fuel mixture supply passage to the crankcase, for pre-compression therein. That is, air-fuel mixture pre-compressed in the crankcase is not supplied to the pre-chamber. Instead, the rich air-fuel mixture generated in the second passage of the carburetor is supplied through an additional air-fuel mixture supply passage to the pre-chamber. The pre-chamber and the combustion chamber communicate with each other via a torch nozzle. The pre-chamber is fitted with an ignition plug. The rich air-fuel mixture in the pre-chamber is ignited by activation of the ignition plug and burns inside the pre-chamber, allowing flames to be ejected through the torch nozzle into the combustion chamber.

Patent Document 3 discloses a water-cooled two-cylinder two-stroke diesel engine. Since this two-stroke engine is a diesel engine, it has no ignition plug. The engine of Patent Document 3 includes a flattened cylindrical pre-chamber formed in the cylinder head, the pre-chamber being supplied with fuel from a fuel injection nozzle.

In the diesel engine of Patent Document 3, air is supplied as intake gas to the crankcase. The air is pre-compressed in the crankcase, and the pre-compressed air is supplied through scavenging passages to the combustion chamber. The pre-chamber and the combustion chamber communicate with each other via a communication hole(s). Air in the combustion chamber is introduced through the communication hole(s) into the pre-chamber where swirl forms.

Describing specifically, the communication hole is composed of a passage having a first opening that opens into the combustion chamber and a second opening that opens into the pre-chamber, the communication hole being directed to a direction along a side wall surface of the cylindrical pre-chamber. That is, the communication hole has a slantly extending passage shape with mutually offset first and second openings and generates swirl, i.e. a gas flow along the side wall that is circular in plan view of the cylindrical pre-chamber. Within the interior of the pre-chamber, fuel discharged from the fuel injection nozzle is mixed by swirl, and the air-fuel mixture ignites and combusts by raised compression heat in the pre-chamber accompanying the ascent of the piston so that combustion gas is discharged from the pre-chamber through the communication hole(s) into the combustion chamber.

Patent Document 1: US2011-0079206A1
Patent Document 2: JP1974(S49)-78003A
Patent Document 3: JP2000-248941A Up until now, the crankcase compression type two-stroke engine with the pre-chamber has not been put into practical use.

SUMMARY OF THE INVENTION

An object of the present invention is to provide a two-stroke engine capable of preventing uncertainty of ignition in each cycle.

The above technical object is achieved by providing a two-stroke engine having:
an ignition device;
a combustion chamber defined by a piston;
a scavenging port opening into the combustion chamber, the scavenging port opened and closed by the piston; and
a scavenging passage allowing the combustion chamber to communicate through the scavenging port with a crankcase,
in a scavenging stroke, intake gas pre-compressed in the crankcase being supplied through the scavenging port to the combustion chamber to generate a scavenging gas flow inside the combustion chamber, the scavenging gas flow squeezing burnt gas within the combustion chamber into an exhaust port, for exhaust, the two-stroke engine comprising:
a separating wall confining a tip end portion of the ignition device;
an ignition promoting chamber formed by the separating wall, the ignition promoting chamber independent of the combustion chamber and enclosing the tip end portion of the ignition device; and a plurality of communication holes disposed in the separating wall, each having a first opening that opens into the combustion chamber and a second opening that opens into the ignition promoting chamber, to allow the combustion chamber and the ignition promoting chamber to communicate with each other.

Functions and effects and other objects of the present invention will become apparent from the following detailed description that encompasses an embodiment and variants of the present invention.

DETAILED DESCRIPTION OF THE PRESENT INVENTION

Figure 1:
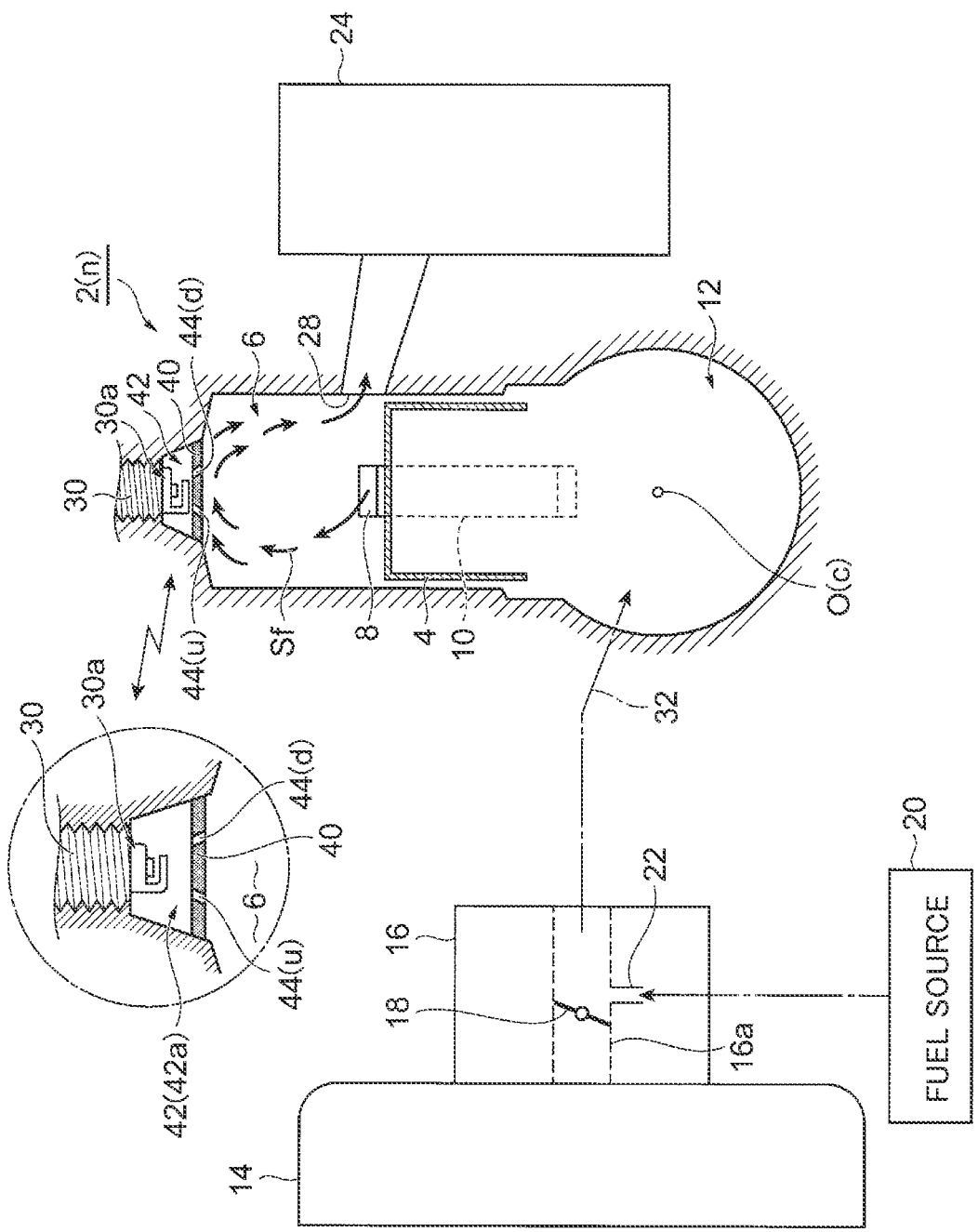
FIG. 1 shows a diagram for explaining an example of an overall configuration of a crankcase compression type engine according to the present invention, showing a standard scavenging engine.
Figure 2:
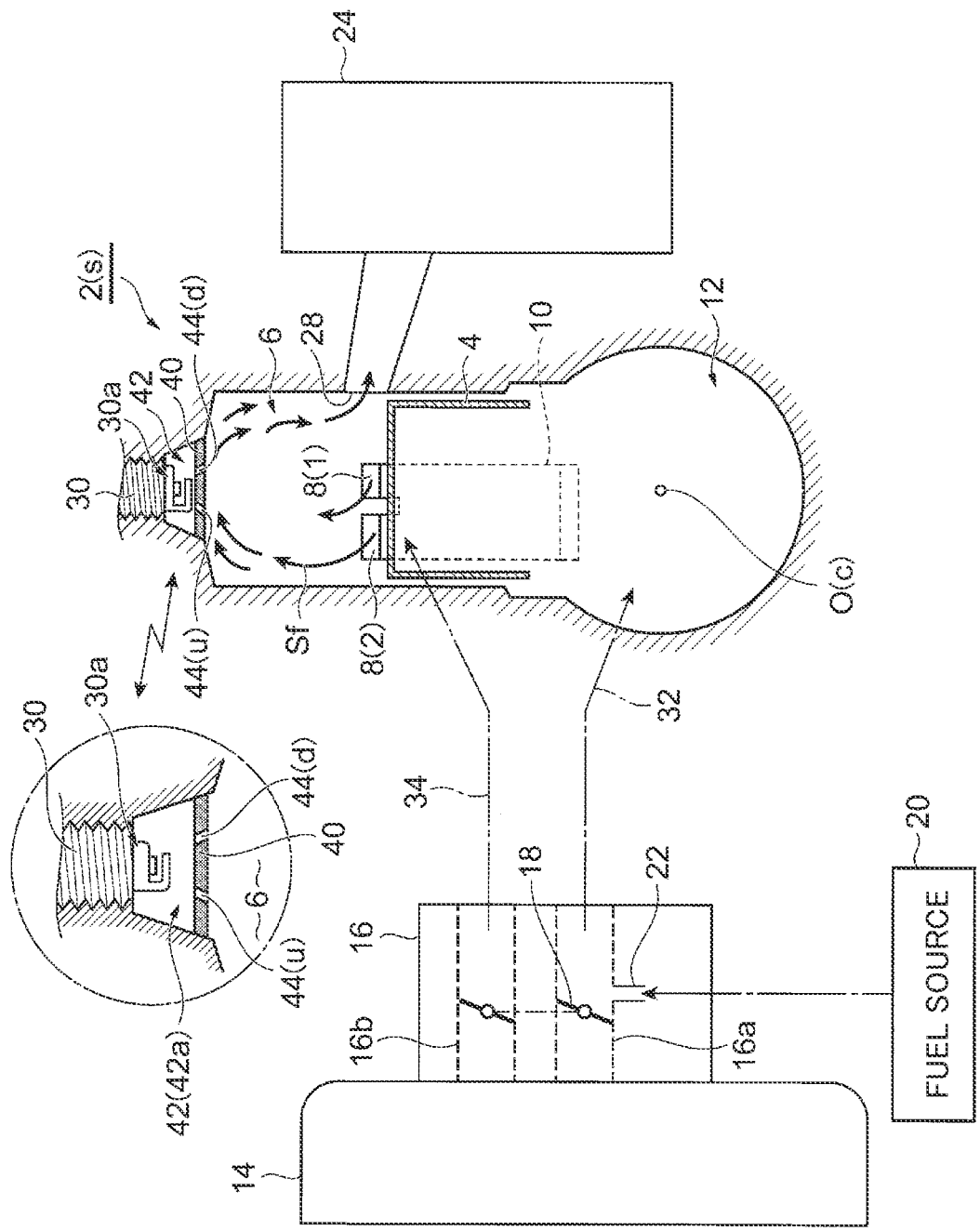
FIG. 2 shows a diagram for explaining an example of an overall configuration of a crankcase compression type engine according to the present invention, showing a stratified scavenging type engine.

The present invention will now be described with reference to the accompanying drawings. FIGS. 1 and 2 are schematic configuration diagrams of an example of a typical two-stroke engine of crankcase compression type according to the present invention. This engine is used as a power source for a work machine, typically a handheld work machine. Specific examples of the handheld work machine include a chainsaw, a brush cutter, a trimmer, and a blower.

In FIGS. 1 and 2, reference numeral 2 denotes an air-cooled single cylinder two-stroke engine. The two-stroke engine 2 has a combustion chamber 6 defined by a piston 4, with scavenging ports 8 opening into the combustion chamber 6. Each scavenging port 8 communicates through a scavenging passage 10 with a crankcase 12. The scavenging port 8 is opened and closed by the piston 4. In the diagrams, reference letter "O(c)" denotes a center axis of a crankshaft (not shown).

In the diagrams, reference numeral 14 denotes an air cleaner. Air purified by the air cleaner 14 is supplied to a carburetor 16. A throttle valve 18 is arranged in a passage 16a of the carburetor 16, to control the engine output. Although a butterfly valve is shown as the throttle valve 18, the butterfly valve may be replaced with a rotary valve. The carburetor 16 allows fuel of a fuel source 20 to be supplied through a discharge portion 22 to an in-carburetor passage 16a, for generation of air-fuel mixture in the in-carburetor passage 16a. As a variant, the fuel discharge portion 22 may be replaced with a fuel injection nozzle. Regarding the fuel supply to the engine 2, the fuel injection nozzle may be disposed on an air-fuel mixture supply passage 32 to directly supply fuel to the air-fuel mixture supply passage 32, or the fuel injection nozzle may be disposed on the crankcase 12 to directly supply fuel to the crankcase 12 while preventing air-fuel mixture to pass through the air-fuel mixture supply passage 32 that is an intake passage. The fuel injection nozzle may be disposed in the scavenging passage 10 to directly supply fuel to the scavenging passage 10. The fuel injection nozzle may be disposed in the combustion chamber 6 to directly supply fuel to the combustion chamber 6. In this case, the fuel nozzle may be directed and inject fuel toward the scavenging port 8 so that air-fuel mixture is carried by scavenging gas flow Sf that will be described later.

In the diagrams, reference numeral 24 denotes an exhaust muffler. The exhaust muffler 24 communicates with an exhaust port 28 which is opened and closed by the piston 4.

In FIGS. 1 and 2, reference numeral 30 denotes an ignition device. The ignition device 30 shown is a well-known spark plug that includes a center electrode and a ground electrode facing the center electrode. The spark plug is supplied with high voltage at each ignition timing and thereby generates sparks electrically to ignite air-fuel mixture. The spark plug is an example of the ignition device 30 and the present invention is not limited thereto. The ignition device 30 may be a plasma jet ignition plug disclosed in e.g. JP-A-2009-224345.

In general terms, a two-stroke engine performs an exhaust stroke and a scavenging stroke in the vicinity of the bottom dead center of the piston 4, as known, and shifts to a compression stroke as the piston 4 ascends. The two-stroke engine thereafter performs a combustion stroke near the top dead center of the piston 4, which is followed by an expansion stroke. In this manner, in the two-stroke engine, the movements of the piston 4 and the strokes are not definitely separated. On the other hand, in a four-stroke engine, the compression stroke, the combustion stroke, the exhaust stroke, and the intake stroke are definitely separated by the piston's ascending and descending movements. The compression ratio of the two-stroke engine is generally lower than that of the four-stroke engine.

FIG. 1 shows a standard scavenging type engine 2. In the standard scavenging type engine 2, air-fuel mixture is supplied as intake gas into the crankcase 12, and the intake gas in the form of air-fuel mixture pre-compressed in the crankcase 12 is supplied through the scavenging passages 10 and the scavenging ports 8 into the combustion chamber 6. It is also conceivable in this case that air before fuel mixing is supplied as the intake gas to the scavenging passages 10, the scavenging ports 8, or the combustion chamber 6. FIG. 2 shows a so-called stratified scavenging type engine 2. In order to identify the standard scavenging type engine 2 shown in FIG. 1 and the stratified scavenging type engine 2 shown in FIG. 2, appendix (n) is imparted to the standard scavenging type engine 2 (FIG. 1) and appendix (s) is imparted to the stratified scavenging type engine 2 (FIG. 2). Reference numeral 2 is used when referring collectively to these two types of two-stroke engines.

Referring to FIG. 1, the carburetor 16 assembled in the standard scavenging type engine 2(n) allows generated air-fuel mixture to be supplied through the air-fuel mixture supply passage 32 to the crankcase 12. On the other hand, the carburetor 16 assembled in the stratified scavenging type engine 2(s) of FIG. 2 has two passages 16a and 16b, with air-fuel mixture being generated in the first in-carburetor passage 16a to be supplied through the air-fuel mixture supply passage 32 to the crankcase 12. Air passes through the second in-carburetor passage 16b and is supplied through the leading air passages 34 to the upper end portion of the scavenging passage 10.

Referring to FIGS. 1 and 2, the engine 2 has a separating wall 40 that confines a tip end portion 30a of the ignition device 30. The separating wall 40 forms an ignition promoting chamber 42 independent of the combustion chamber 6, the ignition promoting chamber 42 having an inner space 42a that encloses the tip end portion 30a of the ignition device 30. It is preferable that the inner space 42a have a limited as small as possible volume. Specifically, it is preferred that the separating wall 40 be arranged at a position closer to the tip end portion 30a without interfering with the tip end portion 30a of the ignition device 30.

The separating wall 40 has at least two communication holes 44. The communication holes 44 open to the ignition promoting chamber 42 and the combustion chamber 6, each communication hole 44 allowing communication between the ignition promoting chamber 42 and the combustion chamber 6.

The number of the scavenging ports 8 is arbitrary. FIG. 1 shows a single scavenging port 8, while FIG. 2 shows two scavenging ports 8(1) and 8(2). The first scavenging port 8(1) shown in FIG. 2 is a main scavenging port. The second scavenging port 8(2) adjacent to the main scavenging port 8(1) is located further away from the exhaust port 28. When the main scavenging port 8(1) and the second scavenging port 8(2) are referred to collectively as the scavenging port 8, referring to FIGS. 1 and 2, the scavenging port 8 is oriented upward in a direction away from the exhaust port 28. As a result, when scavenging gas is discharged from the scavenging port 8, the scavenging gas flow Sf indicated by arrows is generated in the combustion chamber 6. The orientation direction of the scavenging port 8 and the shape of the combustion chamber 6 are designed so that the scavenging gas flow Sf generally heads upward in a direction away from the exhaust port 28 and then changes its flow direction at the upper portion of the combustion chamber 6, to fall toward the exhaust port 28.

In general, although the engine 2 is cold at startup, the engine 2 itself gradually warms up when it begins to run. Since the two-stroke engine allows unburnt gas to remain within the combustion chamber 6 even in the scavenging stroke due to its structure, the engine 2 tends to warm up more easily than the four-stroke engine. Scavenging gas containing air-fuel mixture is therefore warmed by passing through the scavenging passage 10. When scavenging gas containing air-fuel mixture is discharged from the scavenging port 8 to the combustion chamber 6, the scavenging gas flow Sf containing air-fuel mixture is warmed also in the process of passing through the interior of the combustion chamber 6. In consequence, when scavenging gas containing air-fuel mixture passes through the interior of the scavenging passage 10, air-fuel mixture can be warmed within the scavenging passage 10, and further when scavenging gas containing air-fuel mixture passes through the interior of the combustion chamber 6, air-fuel mixture can be warmed also within the interior of the combustion chamber 6.

In the case of directly supplying fuel to the combustion chamber 6 from the fuel injection nozzle disposed in the combustion chamber 6, air is supplied as intake gas to the crankcase and the air pre-compressed in the crankcase is discharged through the scavenging passage 10 into the combustion chamber 6. This air passing through the interior of the scavenging passage 10 is warm and hence scavenging gas containing this warm air is discharged from the scavenging port 8 into the combustion chamber 6. When fuel is injected from the fuel injection nozzle disposed in the combustion chamber 6 toward air flow, i.e., the scavenging gas flow Sf discharged from the scavenging port 8, the scavenging gas flow Sf containing air-fuel mixture is warmed within the combustion chamber 6. In other words, as compared with the case of supplying fuel into the pre-chamber by the fuel injection nozzle, supply of fuel into the combustion chamber has a greater effect of warming air-fuel mixture.

The ignition promoting chamber 42 is preferably arranged at a position where the flow velocity of the scavenging gas flow Sf is relatively high and/or at a position where the flow rate of scavenging gas is relatively high. A communication hole 44(u) lying upstream of the scavenging gas flow Sf, of the plurality of communication holes 44 of the separating wall 40 forming the ignition promoting chamber 42, is preferably oriented in a direction receiving the scavenging gas flow Sf. This makes it easy for air-fuel mixture carried by the scavenging gas flow Sf within the combustion chamber 6 to flow into the ignition promoting chamber 42 in the scavenging stroke or the compression stroke.

In the four-stroke engine, as described above, the compression stroke, the combustion stroke, the exhaust stroke, and the intake stroke are distinctly separated in relation to the vertical movements of the piston. In general terms, although the ignition device becomes heated in the combustion stroke accompanied by ignition, the four-stroke engine allows heat of the tip end portion of the ignition device and heat of a local hot spot to be diffused into the combustion chamber in the intake stroke.

The engine according to the present invention is the two-stroke engine. In the two-stroke engine 2 as an example of the embodiment, as described above, the compression stroke is carried out following the scavenging stroke performed near the bottom dead center of the piston 4. Since the scavenging stroke and the compression stroke are continuous, the two-stroke engine 2 is in an environment where heat of the tip end portion 30a of the ignition device 30 is retained. According to the present invention, due to the separating wall 40 confining the tip end portion 30a of the ignition device 30, heat of the tip end portion 30a of the ignition device 30 is trapped so that air-fuel mixture contained in the scavenging gas within the ignition promoting chamber 42 can be heated by heat of the tip end portion 30a of the ignition device 30.

In general, ignition by the ignition device 30 occurs by the following mechanism. When the ignition device 30 discharges, energy is imparted to air-fuel mixture present between a central electrode 102 and a ground electrode 104. By this energy, a fuel component in air-fuel mixture rises in temperature and starts a chemical reaction for ignition. For this reason, it is possible to promote the rise in temperature leading to ignition by heating air-fuel mixture through utilization of heat of the tip end portion 30a of the ignition device 30 confined by the separating wall 40. As a result, the certainty of ignition can be enhanced at each cycle. As described above, when air-fuel mixture is formed earlier than the scavenging stroke by supplying fuel before passing through the scavenging passage 10, the temperature of the air-fuel mixture can be more raised in the scavenging passage 10 and the combustion chamber 6.

When air-fuel mixture ignites in the ignition promoting chamber 42, since the ignition promoting chamber 42 has a limited volume as described above, a flame immediately erupts through the communication hole 44 into the combustion chamber 6. Due to formation of the plurality of communication holes 44 in the separating wall 40, flames erupting in plural directions from the plurality of communication holes 44 can increase the flame propagation velocity inside the combustion chamber 6. Since the flow of the scavenging gas flow Sf is kept also in the compression stroke and the subsequent combustion stroke, flames carried by the scavenging gas flow Sf can further increase the flame propagation velocity.

Increased flame propagation velocity in the combustion stroke brings about an effect of reducing the occurrence of knocking. There is also another effect of stabilizing combustion because unburnt gas can be burned that could not hitherto be completely burned due to short cycle of the two-stroke engine. This enables emission characteristics to be improved while increasing the engine output.

EMBODIMENT

Figure 3:
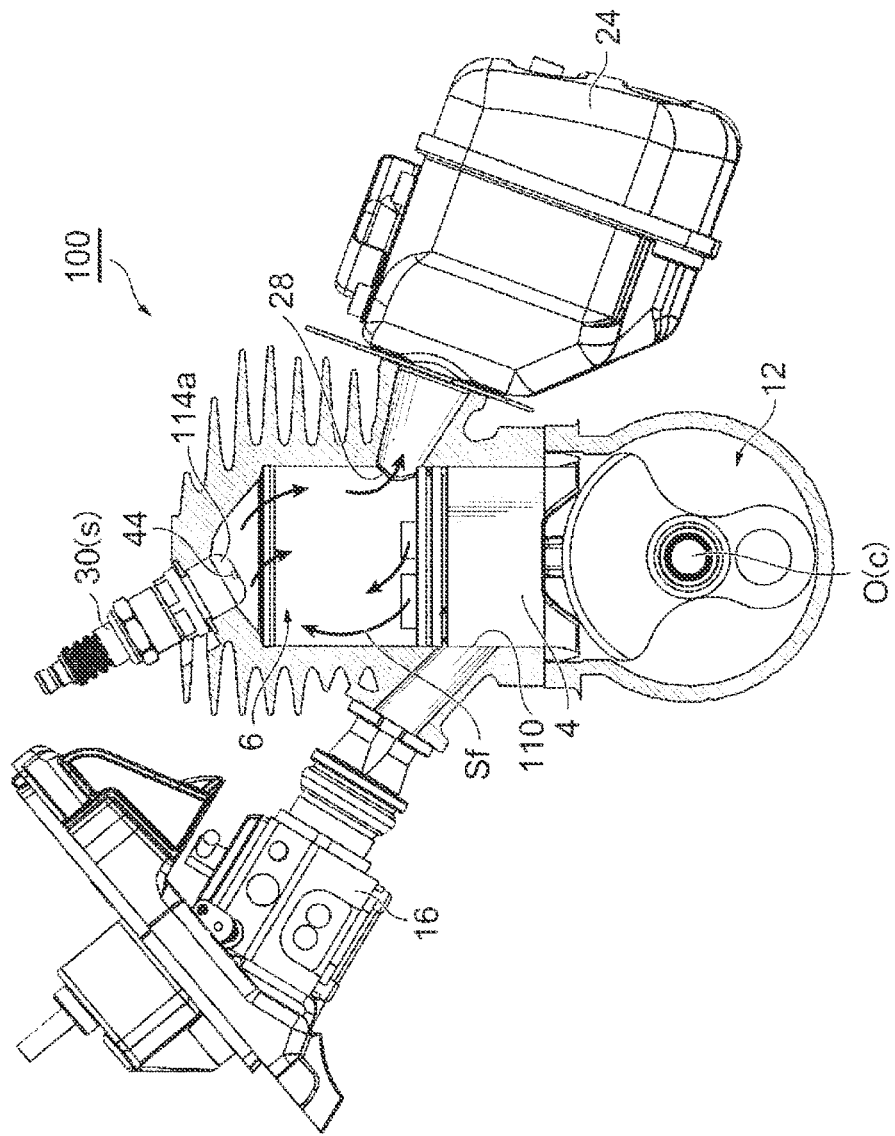
FIG. 3 shows a diagram for explaining an overall configuration of a two-stroke engine of an example of an embodiment.
Figure 4:
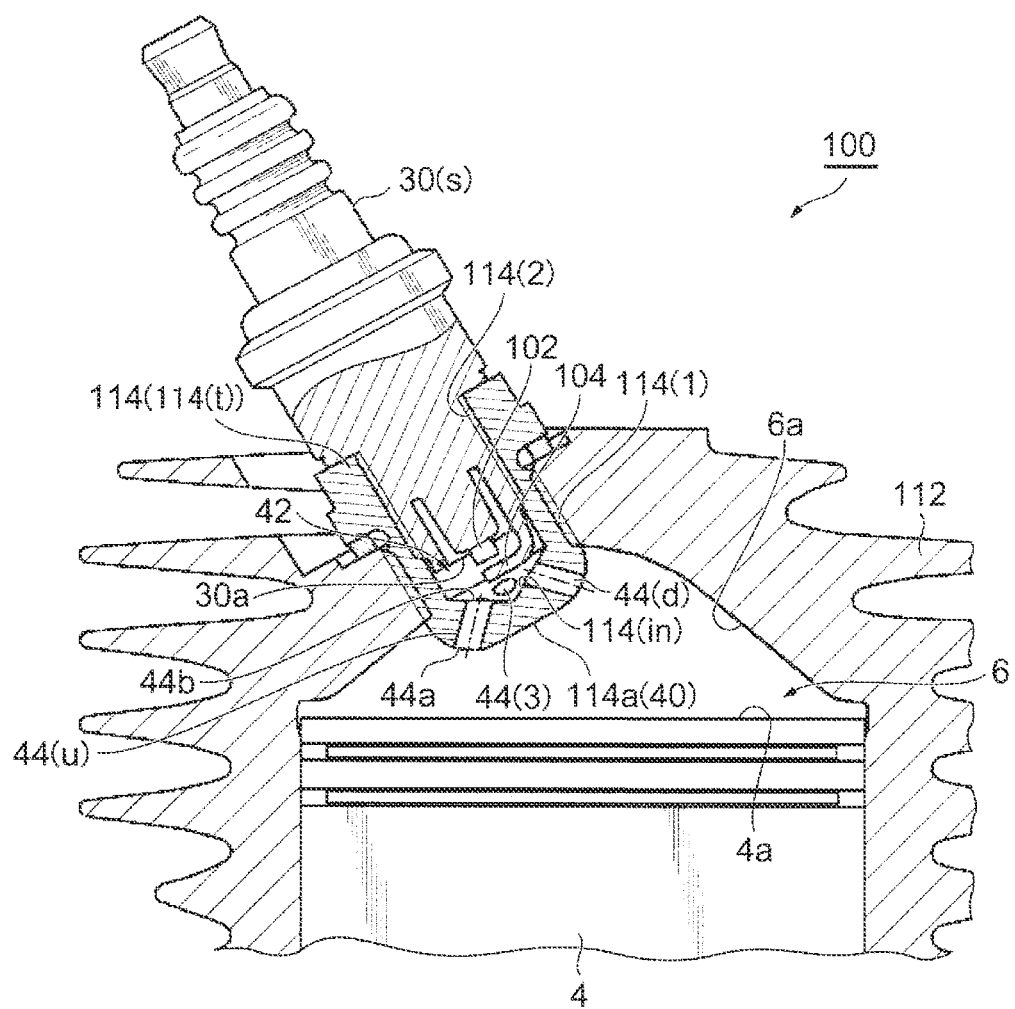
FIG. 4 shows a section view of an upper end portion of the engine shown in FIG. 3.
Figure 5:
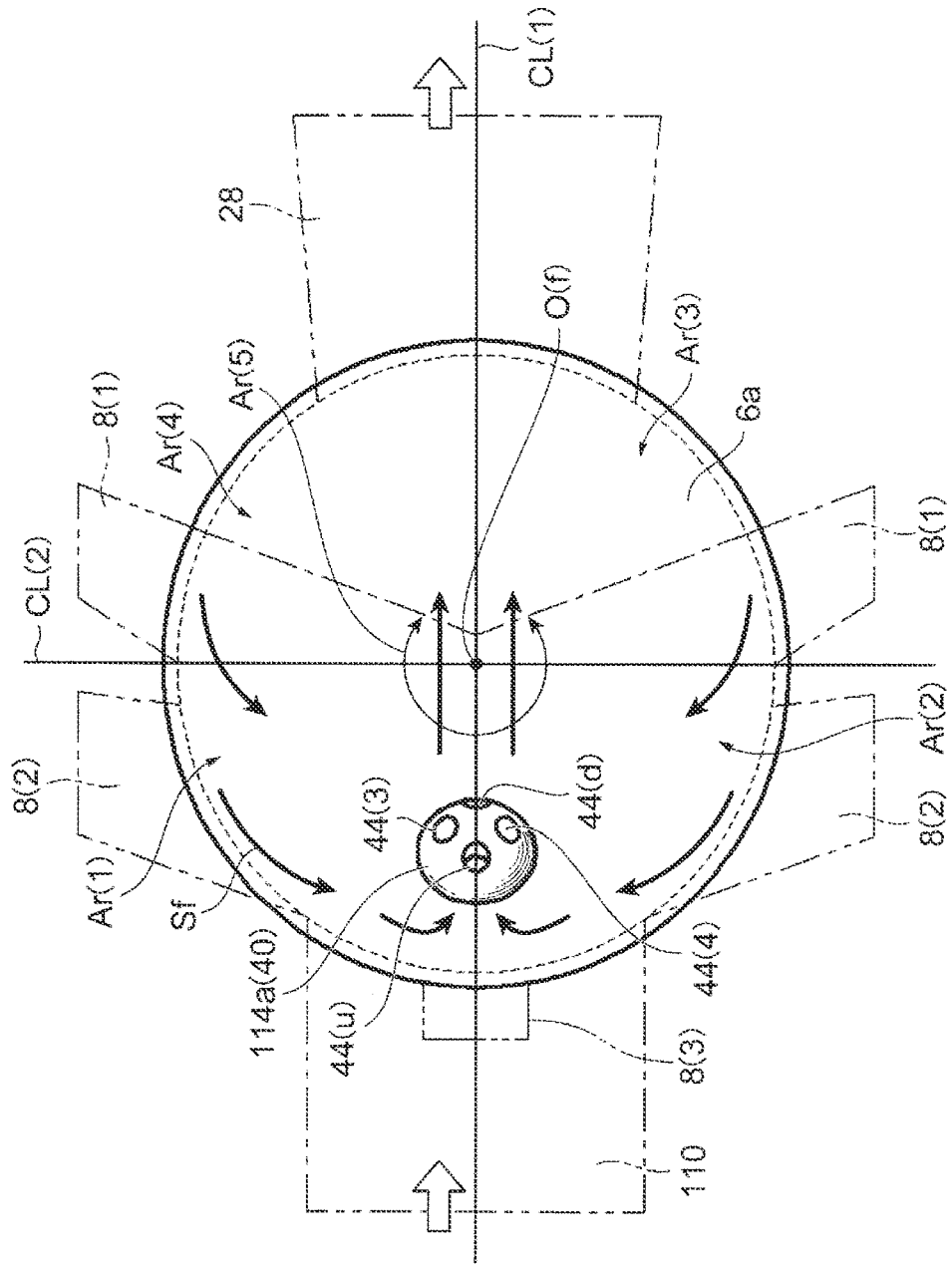
FIG. 5 shows a schematic explanatory view of a top surface of a combustion chamber of the engine shown in FIG. 3.

An example of a preferred embodiment and variants of the present invention will hereinbelow be described. The same elements as the above elements, of elements included in the example embodiment and the variants, will be described with the same reference numerals. FIGS. 3 to 5 show a two-stroke engine 100 of the embodiment. FIG. 3 is a view for explaining an overall outline. FIG. 4 is a section view of an upper end portion of an engine body. FIG. 5 is a schematic explanatory view of a top surface of the combustion chamber, seen from below.

Referring to FIGS. 3 and 4, the two-stroke engine 100 of the embodiment employs a spark plug 30(s) as the ignition device 30. In FIG. 4, the spark plug 30(s) has at its tip end portion 30a, as is well known, the central electrode 102 and the ground electrode 104 located in front of and adjacent to the central electrode 102, with a gap between the central electrode 102 and the ground electrode 104.

In FIG. 3, reference numeral 110 denotes an intake port. The intake port 110 is opened and closed by the piston 4. As a variant, the intake port 110 may be opened and closed by a reed valve. In plan view, the intake port 110 is arranged diametrically facing the exhaust port 28 with the combustion chamber 6 having a circular cross-section in between.

Referring to FIG. 5, in plan view, the intake port 110 is arranged facing the exhaust port 28 on a first center line CL(1) extending through a center O(1) of the combustion chamber 6. The engine 100 has a main scavenging port 8(1) and a second scavenging port 8(2) on each side of the first center line CL(1) extending therebetween. Scavenging gas discharged from the main scavenging port 8(1) and the second scavenging port 8(2), i.e. air-fuel mixture pre-compressed in the crankcase 12 generates a scavenging gas flow St flowing toward the side opposite to the exhaust port 28, i.e. upward toward the intake port 110 as described above.

Regarding the above scavenging port 8, the two-stroke engine 100 of the embodiment may optionally include a third scavenging port 8(3) (FIG. 5). The third scavenging port 8(3) is arranged on the first center line CL(1) on the opposite side to the exhaust port 28 and is oriented upward. This type of scavenging port 8(3) is well known and is called "booster port".

In FIG. 5, reference letter and numeral CL(2) denotes a second center line orthogonal to the first center line CL(1). The second center line CL(2) extends through the center O(f) of the combustion chamber 6. A top surface 6a of the combustion chamber 6 can be divided into four top surface areas Ar(1) to Ar(4) by the first and second center lines CL(1) and CL(2). The first and second top surface areas Ar(1) and Ar(2) are located on the side of the intake port 110. The third and fourth top surface areas Ar(3) and Ar(4) are located on the side of the exhaust port 28.

Referring to FIG. 5, the above separating wall 40 is arranged offset from the center O(f) of the combustion chamber 6 toward the intake port 110. More specifically, the separating wall 40 is arranged at the border between the first and second top surface areas Ar(1) and Ar(2). As can be seen best from FIG. 4, the separating wall 40 is composed of a cap member 114 that is a member different from a cylinder 112 forming the combustion chamber 6.

The cap member 114 is made of resin or metal. Preferably, it is made of heat-resistant resin or heat-resistant metal. The cap member 114 is of a bottomed cylindrical shape, with a tubular portion 114(t) having a first threaded portion 114(1) on its outer circumferential surface and a second threaded portion 114(2) on its inner circumferential surface.

The cap member 114 is screwed via the first threaded portion 114(1) to the cylinder 112, while the spark plug 30(s) is screwed via the second threaded portion 114(2) to the cap member 114. As a variant, the cap member 114 need not necessarily have the first threaded portion 114(1), and instead may be fitted into and secured to the cylinder 112 by press-fitting or adhesive applied to a gap between the cylinder 112 and the cap member 114. Bolts may be used to fix the cylinder 112 and the cap member 114 together. Other than these, the cap member 114 may be insert molded when molding the cylinder 112. The above are mere examples, and the manner of fixing the cap member 114 to the cylinder 112 is not particularly limited.

The piston 4 has a flat top surface 4a. A closed end portion 114a of the cap member 114 is arranged protrudingly in the combustion chamber 6 formed by the piston 4, the closed end portion 114a substantially constituting the above separating wall 40. An inner surface 114(in), toward the spark plug 30(s), of the closed end portion 114a is shaped as a mountain-like concave surface. By imparting the concave shape to the inner surface 114(in), the closed end portion 114a is positioned at a position closer to the tip end portion of the spark plug 30(s) while avoiding interference with the ground electrode 104 of the spark plug 30(s), whereby the ignition promoting chamber 42 can have an as small as possible volume.

The closed end portion 114a of the cap member 114, as described above, constitutes the separating wall 40 to form the ignition promoting chamber 42. Referring to FIG. 5, the closed end portion 114a has four communication holes 44 formed around the center of the closed end portion 114a. A first communication hole 44(u) is arranged on the first center line CL(1) toward the intake port 110, i.e. at a position where the scavenging gas flows Sf meet and gather in a bundle, i.e. on the upstream side of the scavenging gas flows Sf. A second communication hole 44(d) is arranged on the first center line CL(1) toward the exhaust port 28, i.e. on the downstream side of the scavenging gas flows Sf. Third and fourth communication holes 44(3) and 44(4) are arranged parallel to the second center line CL(2) on a line extending through the center of the closed end portion, facing each other with the center of the closed end portion 114a in between.

Referring to FIG. 4, the four communication holes 44 have a passage shape tilting toward the central electrode 102 of the spark plug 30(s), i.e. the local hot spot. The communication holes 44 each have a passage shape extending rectilinearly and with tilt, that has a first opening 44a toward the combustion chamber 6 and a second opening 44b toward the ignition promoting chamber 42.

The closed end portion 114a located protruding into the combustion chamber 6 directly receives the scavenging gas flow Sf, as compared with the case where it is located deep inside the wall of the cylinder 112. The first opening 44a of the first communication hole 44(u) formed in the closed end portion 114a protruding into the combustion chamber 6, as can be seen from FIG. 5, is oriented so as to accept the scavenging gas flow Sf.

Due to having the above configuration, the first communication hole 44(u) opening into the combustion chamber 6 can accept the scavenging gas flow Sf to promote gas exchange inside the ignition promoting chamber 42. In particular, since the second communication hole 44(d) paired with the first communication hole 44(u) is located toward the exhaust port 28 on the first center line CL(1), i.e. downstream of the scavenging gas flows Sf, gas remaining inside the ignition promoting chamber 42 can easily be squeezed through the downstream second communication hole 44(d) into the combustion chamber 6 by scavenging gas entering from the first communication hole 44(u) located at a position where the scavenging gas flows Sf meet and gather in a bundle.

Air-fuel mixture contained in the scavenging gas flow Sf accepted into the ignition promoting chamber 42 is heated by heat of the tip end portion 30a of the spark plug 30(s). Heating of air-fuel mixture can promote the temperature rise leading to ignition of the fuel component and enhance the ignitability of air-fuel mixture.

When ignited by activation of the spark plug 30(s), flames erupt through the four communication holes 44 into the combustion chamber 6 due to the small volume of the ignition promoting chamber 42. Since these four communication holes 44 have the tilted passage shape extending from the ignition promoting chamber 42 in a flared manner, flames are erupted from the communication holes 44 in a state of being diffused in all directions at the upper portion of the combustion chamber 6. As a result, the flame propagation velocity inside the combustion chamber 6 can be increased in the combustion stroke. The passage shape of the communication hole 44 may be a flared shape whose diameter increases according as it approaches the combustion chamber 6.

The scavenging gas flow Sf is kept also in the compression stroke and the subsequent combustion stroke. The flame propagation velocity is thus increased by allowing the scavenging gas flow Sf to carry a flame erupted from the second communication hole 44(d) located downstream of the scavenging gas flow Sf. In consequence, the flame erupting from the second communication hole 44(d) can increase the flame propagation velocity in the combustion chamber 6. Flames erupting from the third and fourth communication holes 44(3) and 44(4) are ejected in directions not following the flow of the scavenging gas flow Sf. For this reason, further turbulence occurs in the flow inside the cylinder due to the scavenging gas flow Sf within the cylinder and the force of flame, enabling combustion to be more activated.

As can be well seen from FIG. 4, the top surface 6a of the combustion chamber 6 has a conical shape. The cap member 114 including the spark plug 30(s) is arranged offset from the center O(f) of the combustion chamber 6 and is offset to the side away from the exhaust port 28. Referring to FIG. 5, verification by the inventors proved that prompt gas exchange can be achieved within the ignition promoting chamber 42 by arranging the communication hole 44 in a top surface area Ar(5) toward the intake port 110 partitioned by tangents toward the exhaust port 28 of the right and left main scavenging ports 8(1). It was also confirmed that the scavenging gas flow Sf strongly hits the combustion chamber top surface 6a in the first and second top surface areas Ar(1) and Ar(2) toward the intake port 110. It was further confirmed that the above arrangement ensures not only good gas exchange inside the ignition promoting chamber 42 but also the effect of increasing the flame propagation velocity within the combustion chamber 6 in the combustion stroke. This effect arises from the fact that flames, carried by the flows of the scavenging gas flow Sf still existing in the compression stroke and the subsequent combustion stroke, can be erupted through the four communication holes 44 into the combustion chamber 6. The flames erupted from the communication holes 44 can increase the velocity of the scavenging gas flow Sf and increase the flame propagation velocity within the combustion chamber 6. It is therefore preferred to arrange the ignition promoting chamber 42 particularly in the first and second top surface areas Ar(1) and Ar(2) whose entire regions are contained in the top surface area Ar(5). These first and second top surface areas Ar(1) and Ar(2) contain the center O(f) of the combustion chamber 6. The ignition promoting chamber 42 may therefore be arranged at the center O(f) of the combustion chamber 6.

Variants of the main elements included in the above embodiment will be described based on FIG. 6 and subsequent drawings. In the following description, the same elements as elements included in the above embodiment will be described with the same reference numerals.

In the above embodiment, the ignition promoting chamber 42 is formed by the cap member 114 that is a member separate from the cylinder 112 (FIG. 4). FIG. 6 is a view for explaining a variant in which the cap member 114 is integrally molded with the cylinder 112. In FIG. 6, the cylinder 112 has a bottomed cylindrical cap part 200, with the second threaded portion 114(2) being formed on an inner circumferential surface of a tubular portion 200(t). The above ignition promoting chamber 42 is formed by screwing the ignition device 30 into the second threaded portion 114(2). A closed end portion 200a of the cap part 200 substantially constitutes the above separating wall 40 and is located protruding toward the combustion chamber 6. As can be seen from this variant, the separating wall 40 constituting the ignition promoting chamber 42 included in the present invention may be composed of the cap member 114 separate from the cylinder 112 or may be composed of the cap part 200 integrally formed with the cylinder 112. Since the cap part 200 and the cap member 114 have substantially the same function in that both are the element constituting the ignition promoting chamber 42, the cap part 200 and the cap member 114 may be referred to collectively as "cap element".

The spark plug 30(s) may be fitted later to the cap member 114. As a variant, prior to assembling the spark plug 30(s) to the cylinder 112, the cap member 114 may be assembled to the spark plug 30(s) so that the cap member 114 is a member that constitutes part of the spark plug 30(s), after which the spark plug 30(s) including the cap member 114 may be assembled to the cylinder 112.

Figure 7:
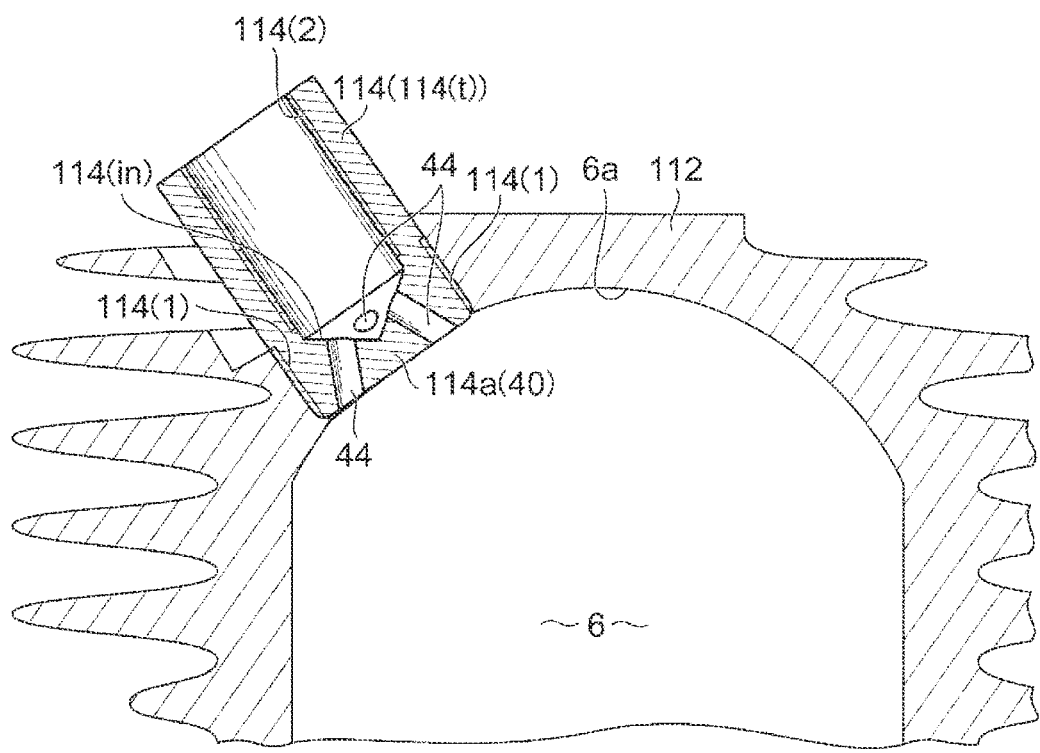
FIG. 7 shows a variant related to arrangement of a separating wall composed of a closed end portion of the cap element that forms the ignition promoting chamber included in the present invention, the separating wall being arranged level with the top surface of the combustion chamber.
Figure 8:
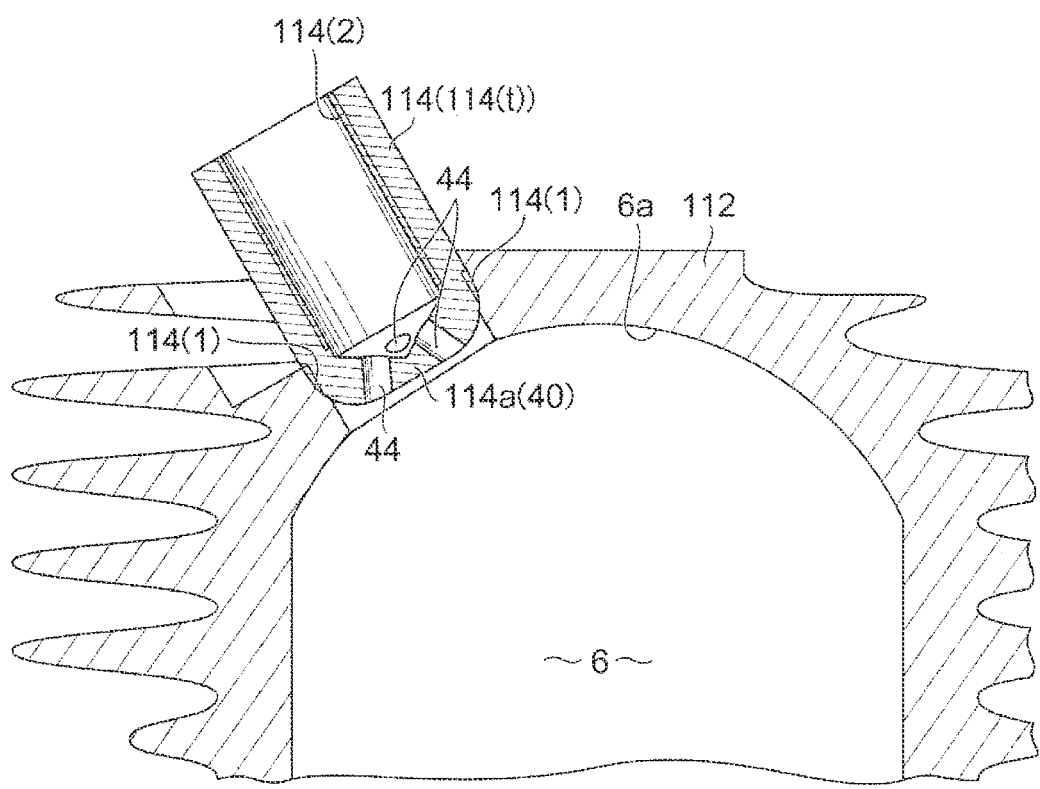
FIG. 8 shows another variant related to arrangement of the separating wall composed of the closed end portion of the cap element that forms the ignition promoting chamber included in the present invention, the separating wall being arranged in a recess of the top surface of the combustion chamber.

FIGS. 7 and 8 exemplify the cap member 114, showing a variant related to the arrangement of the above separating wall 40 composed of the closed end portion 114a of the cap member 114. Referring to FIG. 7, the closed end portion 114a of the cap member 114 may be level with the top surface 6a of the combustion chamber 6. In other words, the separating wall 40 defining the ignition promoting chamber 42 may be arranged flush with the top surface 6a of the combustion chamber 6.

Referring to FIG. 8, the closed end portion 114a of the cap member 114 may be located deep from the top surface 6a of the combustion chamber 6. That is, the separating wall 40 defining the ignition promoting chamber 42 may be arranged in a recess of the top surface 6a of the combustion chamber 6.

Although with reference to FIGS. 7 and 8 the variants related to arrangement of the closed end portion 114a have been described using as an example the cap member 114 that is a separate member from the cylinder 112, the cap member 114 may be substituted by the cap part 200 integrally molded with the cylinder 112.

Figure 9:
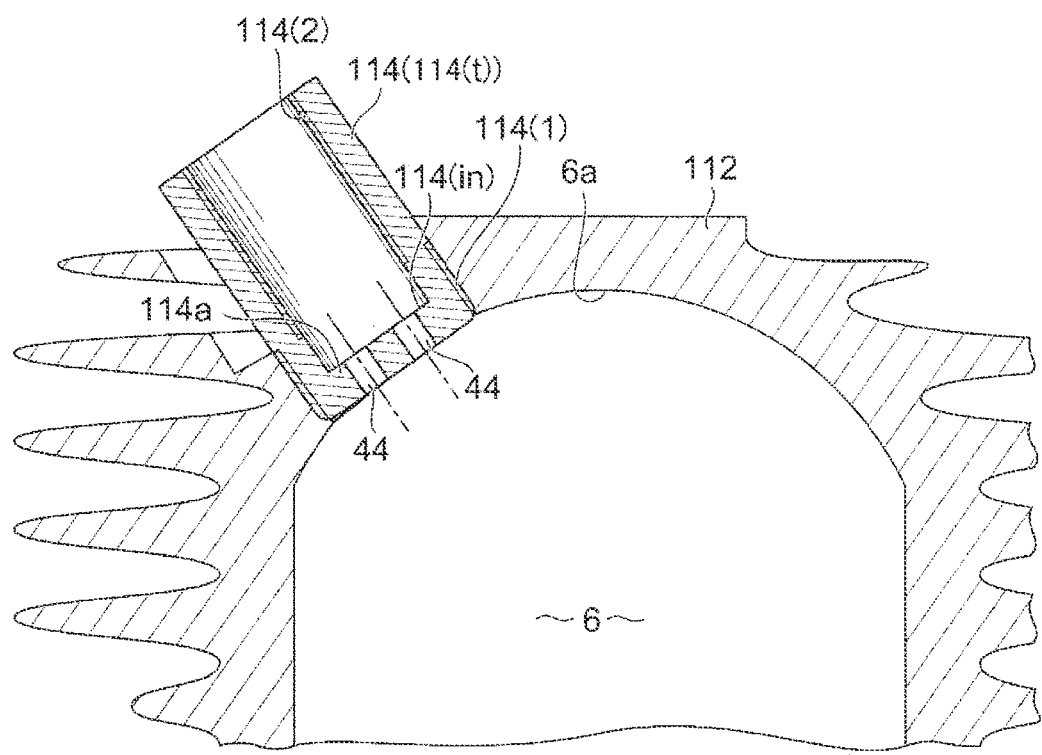
FIG. 9 shows a variant related to a passage shape of a plurality of communication holes of the separating wall composed of the closed end portion of the cap element that forms the ignition promoting chamber included in the present invention, the plurality of communication holes extending parallel to one another.
Figure 10:
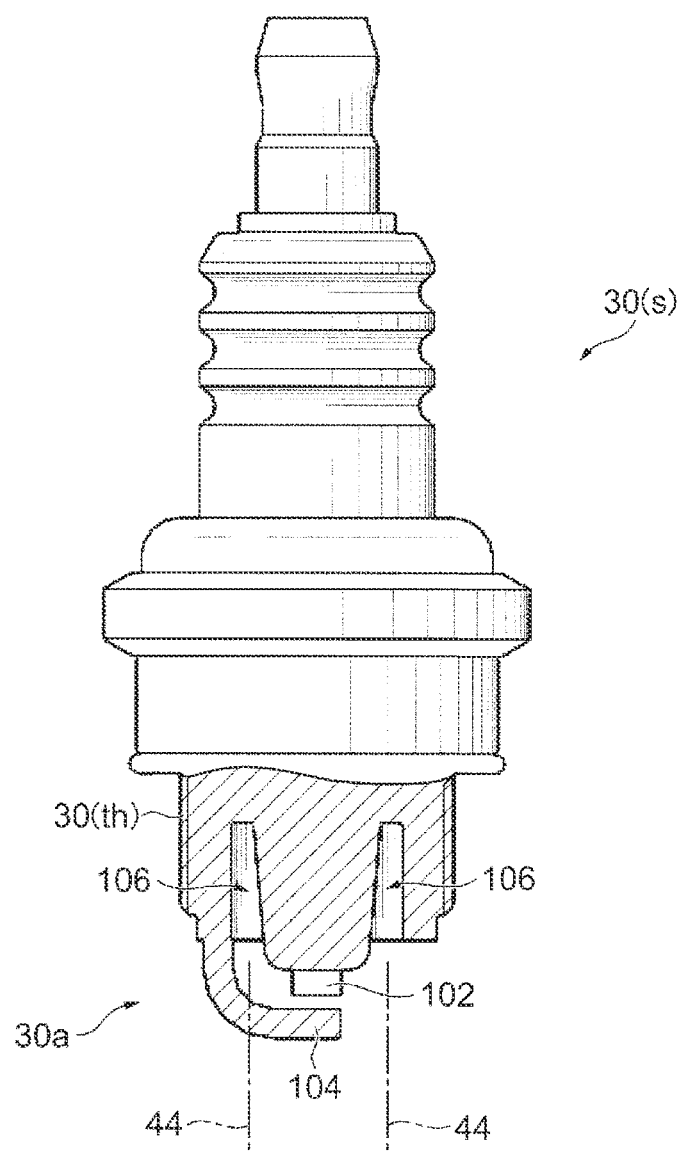
FIG. 10 shows a diagram for explaining a gas pocket of a spark plug toward which the communication holes shown in FIG. 9 are oriented.

In the above embodiment, the four communication holes 44 are formed on inclined axes extending radially from the central electrode 102 of the spark plug 30(s) (FIG. 4). FIG. 9 is a diagram for explaining a variant in which the plurality of communication holes 44 are parallel to one another. The plurality of communication holes 44 formed in the closed end portion 114a of the cap member 114 have their axes parallel to one another. FIG. 10 shows a currently prevailing spark plug 30(s). Reference numeral and letter 30(th) of FIG. 10 denotes a threaded portion of the spark plug 30(s) that is used to assemble the spark plug 30(s) into the engine. The spark plug 30(s) has an annular recess 106 called "gas pocket" around the central electrode 102. The gas pocket 106 retains hot gas and forms a local hot spot. It is preferable that the communication holes 44 extending parallel to one another described with reference to FIG. 9 be arranged such that their respective axes extend toward the gas pocket 106. This enables scavenging gas introduced into the ignition promoting chamber 42 to be oriented toward the gas pocket 106 that is the local hot spot.

FIG. 9 further exemplifies that the inner surface 114(in) of the closed end portion 114a may be a flat surface. FIG. 9 exemplarily shows the cap member 114, which may be the cap part 200 integrally molded with the cylinder 112.

Figure 11:
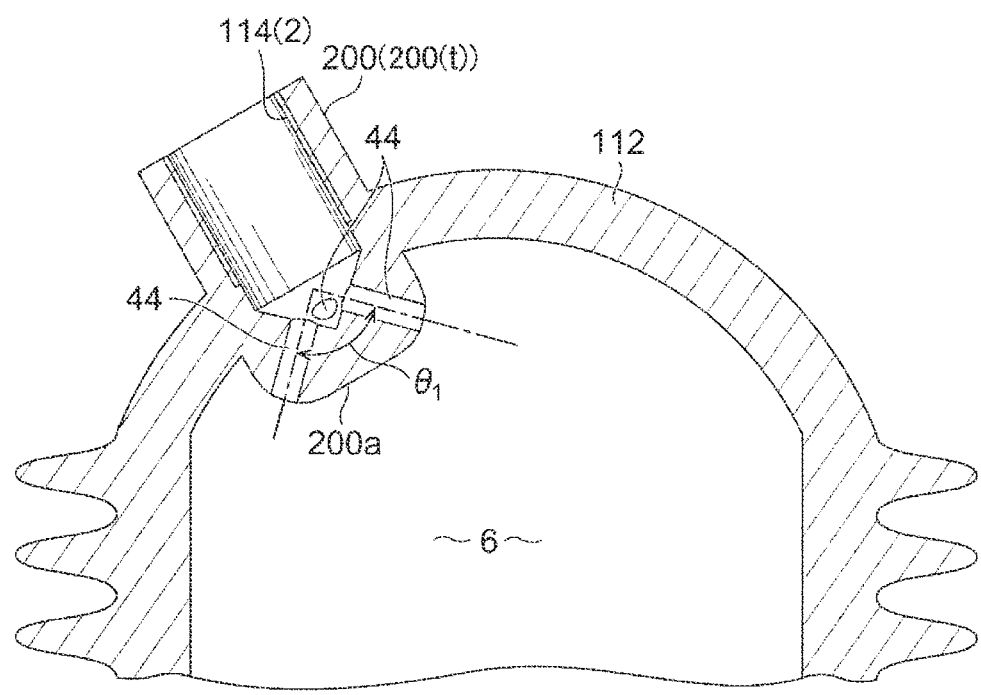
FIG. 11 shows a variant of the wall thickness of the separating wall composed of the closed end portion of the cap element and of the passage shape of the communication holes, in which the separating wall is greater in wall thickness than a tubular portion and in which an intersection angle is 90 degrees at which axes of the plurality of communication holes intersect at a central electrode of the spark plug.
Figure 12:
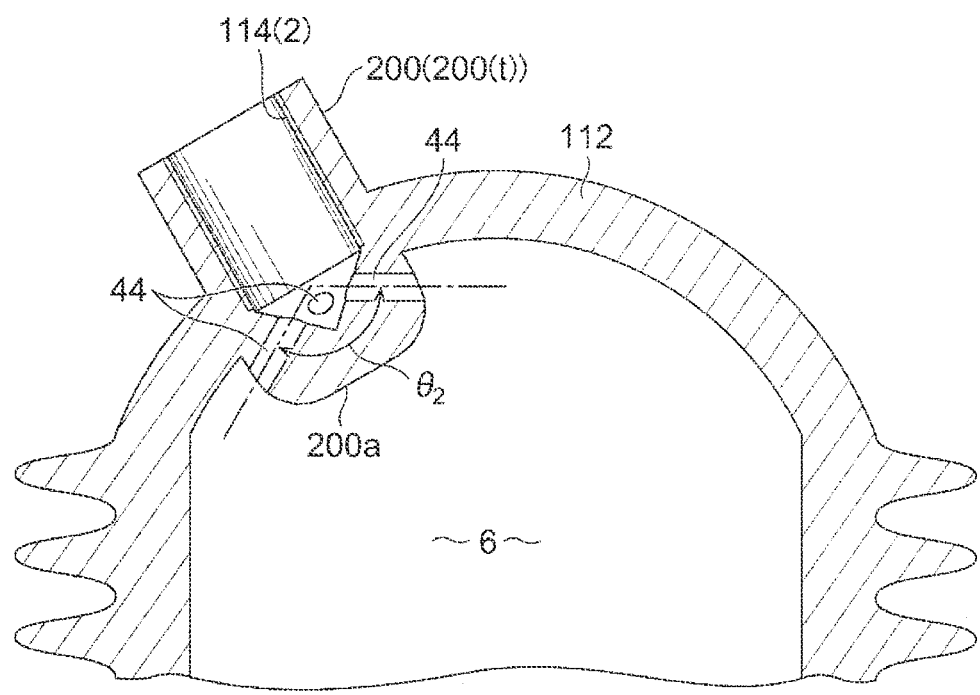
FIG. 12 shows a variant of the wall thickness of the separating wall composed of the closed end portion of the cap element and of the passage shape of the communication holes, in which the separating wall is greater in wall thickness than the tubular portion and in which the intersection angle is 120 degrees at which axes of the plurality of communication holes intersect at the central electrode of the spark plug.

In the cap member 114 included in the above embodiment and the cap part 200 described with reference to FIG. 6, the tubular portion 114(t) or 200(t) and the closed end portion 114a or 200a have the same wall thickness. FIGS. 11 and 12 exemplarily depict the cap part 200 integrally molded with the cylinder 112, but show also that in the cap element including the separate cap member 114, the closed end portion 114a or 200a may be relatively greater in wall thickness than the tubular portion 114(t) or 200(t). By imparting a greater wall thickness to the closed end portion 114a or 200a, the heat accumulation property can be enhanced at that portion.

Although the plurality of communication holes 44 are typically oriented toward the central electrode 102 of the spark plug 30(s) that forms the local hot spot, an intersection angle θ1 where the axes of the communication holes 44 intersect is 90 degrees in a variant shown in FIG. 11, while an intersection angle θ2 is 120 degrees in a variant shown in FIG. 12. In the variant described earlier with reference to FIG. 9, the intersection angle is 0 degrees. In this manner, the specific numerical values of the intersection angle are matters of design, and hence optimum values are set based on specifications of the engine to which the present invention is applied.

Figure 13:
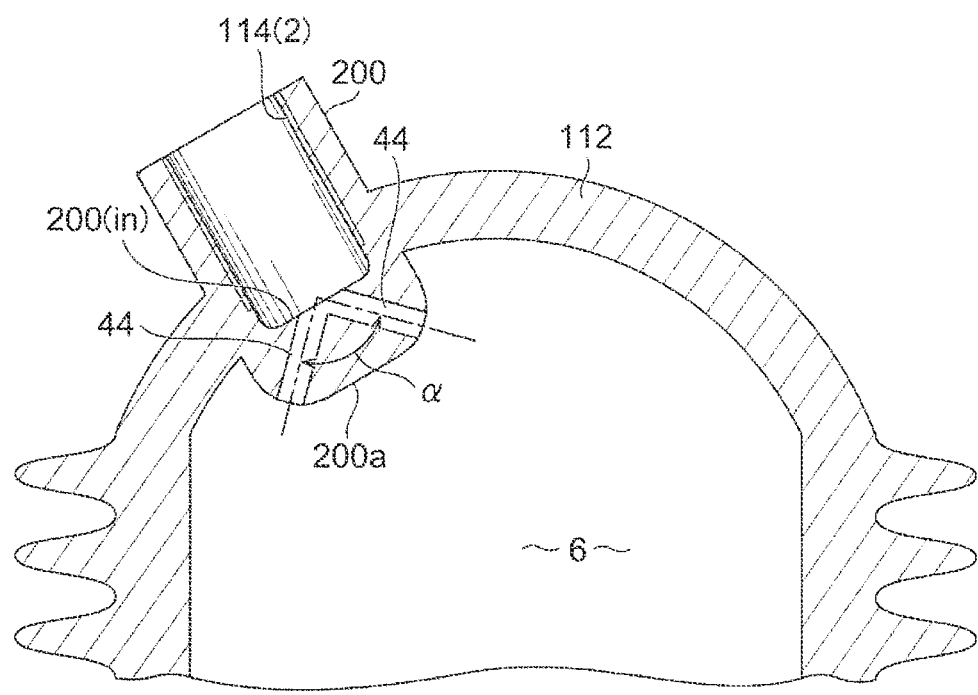
FIG. 13 shows a variant of the passage shape of the communication holes, in which the axes of the plurality of communication holes intersect on an inner surface of the closed end portion.

In the above embodiment, the axes of the plurality of communication holes 44 intersect at the central electrode 102 of the spark plug 30(s) (FIG. 4). In a variant shown in FIG. 13, the axes of the plurality of communication holes 44 intersect on an inner surface 200(in) of the closed end portion 200a. That is, the axes of the plurality of communication holes 44 arranged in the cap element including the separate cap member 114 may intersect inside the ignition promoting chamber 42 or may intersect on the inner surface 114(in) or 200(in) of the closed end portion 114a or 200a. An intersection angle α of the axes of the plurality of communication holes 44 is optional, and the intersection angle α is set to an optimum value, based on specifications of the engine to which the present invention is applied.

Figure 6:
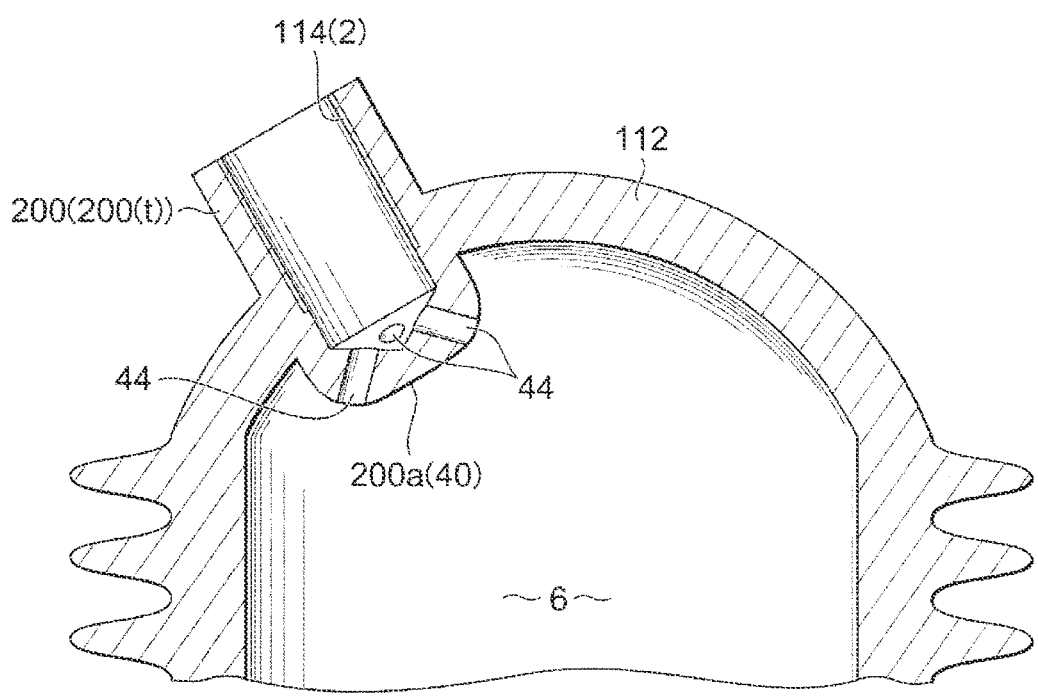
FIG. 6 shows a diagram for explaining a variant in which a cap part is integrally molded with a cylinder, the cap part being a cap element that forms an ignition promoting chamber included in the present invention.
Figure 14:
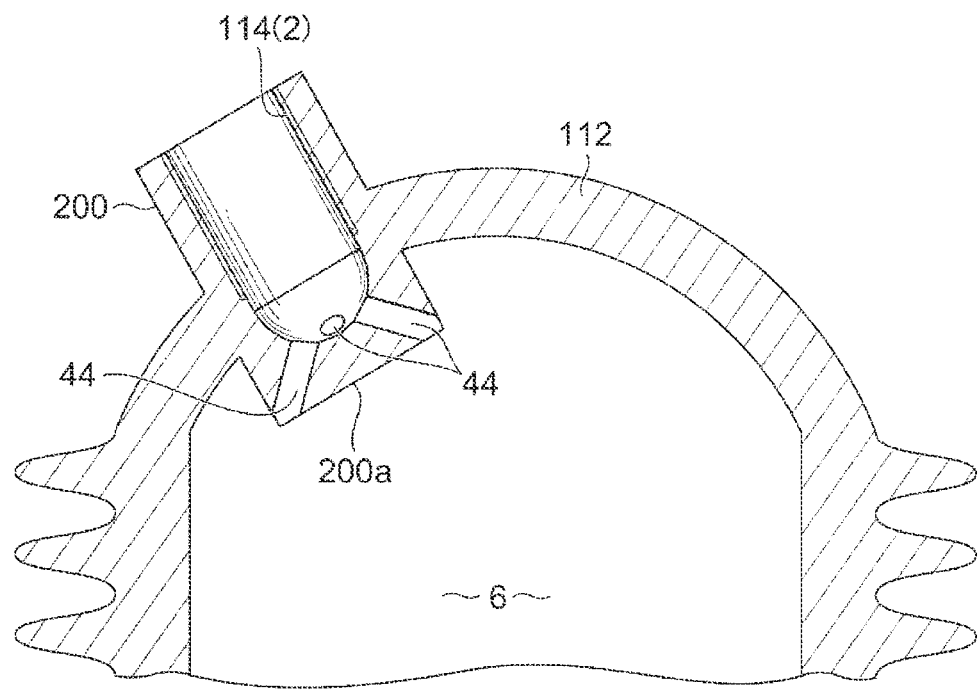
FIG. 14 shows a variant of the external shape of the closed end portion of the cap element, in which the external shape of the closed end portion is an angular cylindrical shape.
Figure 15:
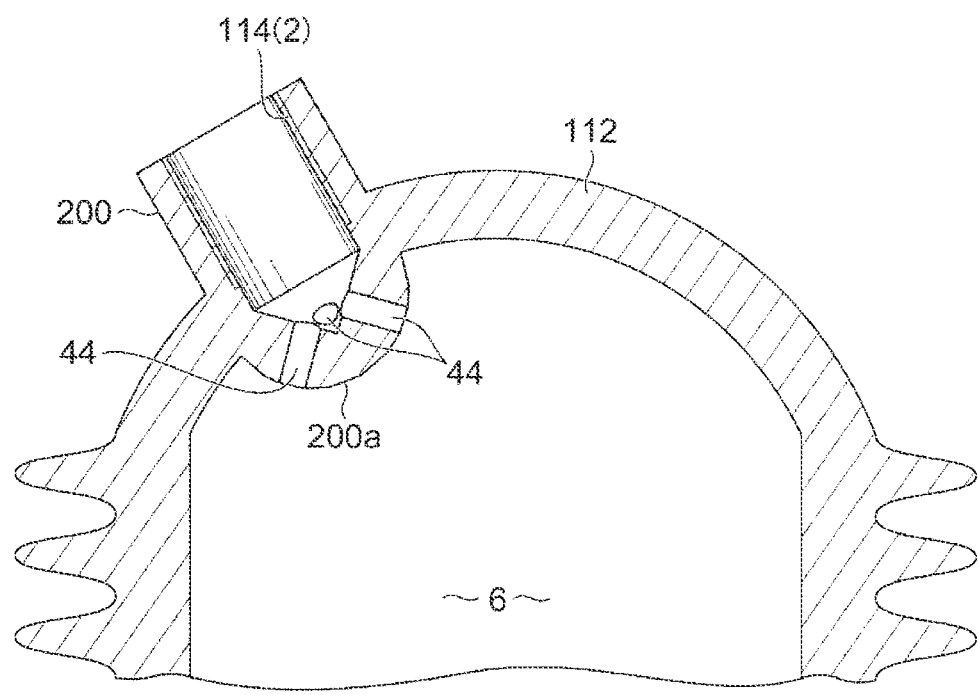
FIG. 15 shows another variant of the external shape of the closed end portion of the cap element, in which the external shape of the closed end portion is a circular dome shape.

As regards the external shape of the closed end portions 114a and 200a of the cap member 114 and the cap part 200, i.e. of the closed end portion of the bottomed cylindrical cap element, the closed end portions 114a and 200a have a curved outer peripheral end portion of a cylinder in the embodiment and the variants (FIGS. 4, 6, etc.). FIG. 14 shows a variant of the cap part 200 integrally molded with the cylinder 112, and the closed end portion 200a of the cap part 200 may have an angular cylindrical shape. The same applies to the cap member 114 separate from the cylinder 112. FIG. 15 shows another variant related to the shape of the closed end portions 114a and 200a of the cap member 114 and the cap part 200. As shown in FIG. 15, the closed end portion 200a of the cap part 200 may have a circular dome shape. The same applies to the cap member 114 separate from the cylinder 112.

Figure 16:
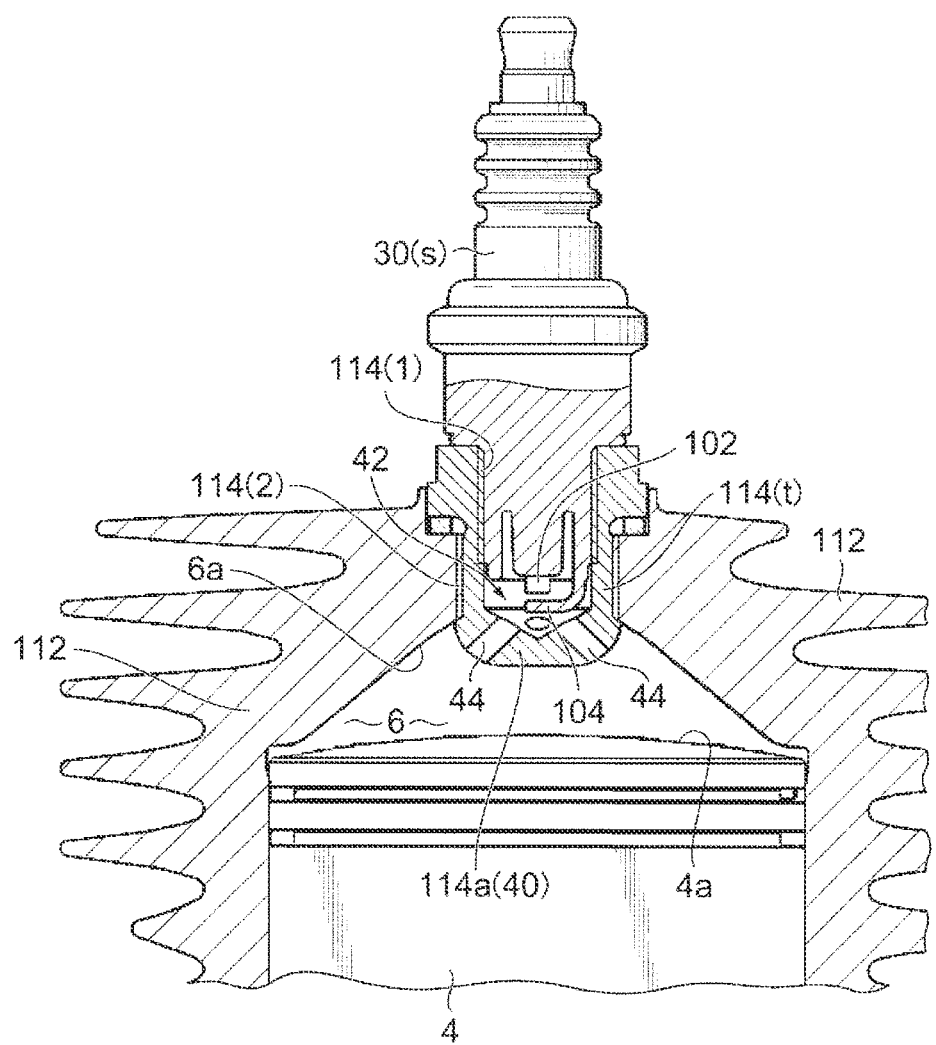
FIG. 16 shows a section view of an engine upper portion of a variant related to the arrangement position of the ignition promoting chamber, in which the ignition promoting chamber lies at a center of the combustion chamber.
Figure 17:
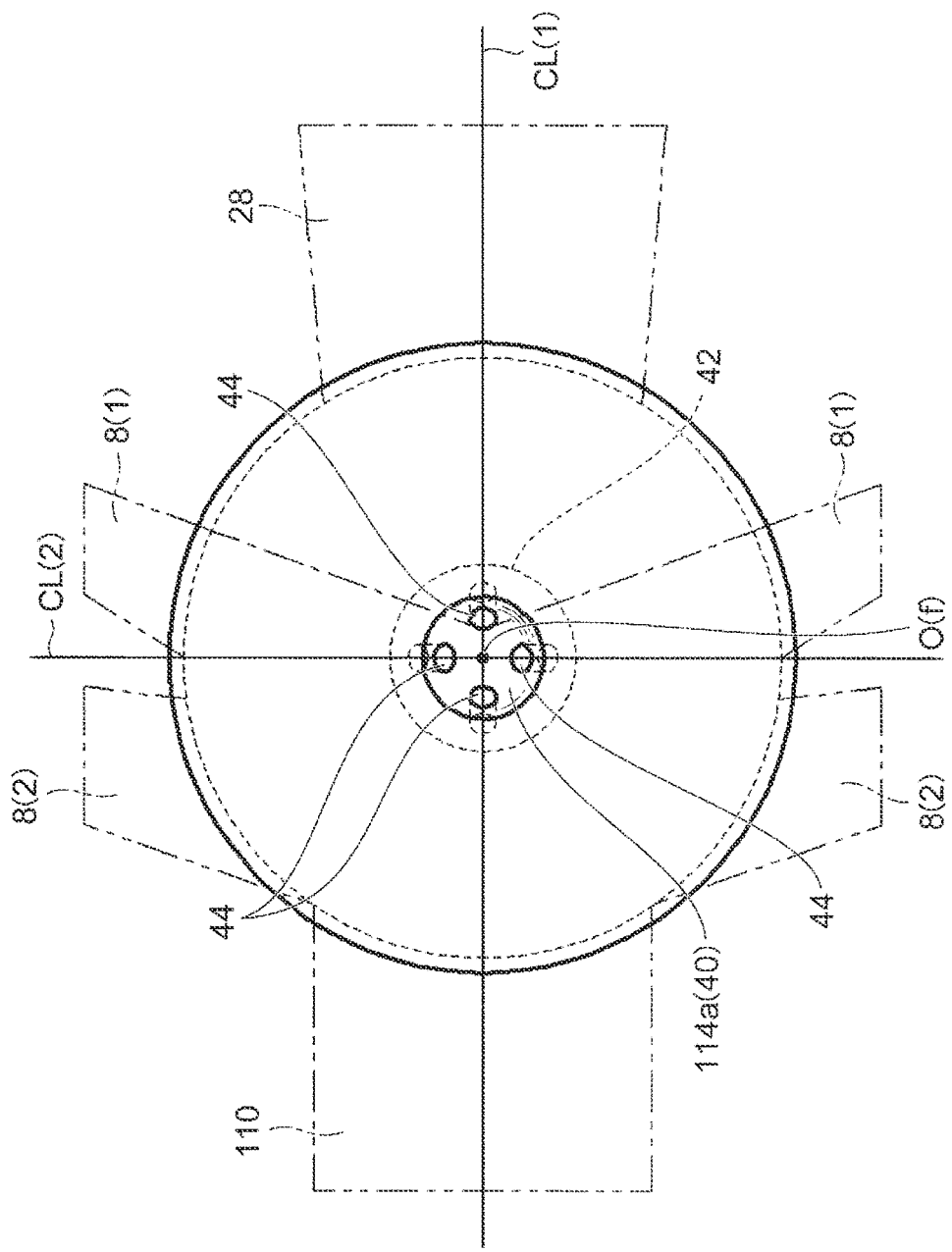
FIG. 17 shows a diagram related to FIG. 16, which is a schematic explanatory view of the top surface of the combustion chamber.

As described earlier with reference to FIG. 5, regarding the arrangement position of the ignition promoting chamber 42, it is preferred that the ignition promoting chamber 42 be arranged in the top surface area Ar(5), preferably in the first and second top surface areas Ar(1) and Ar(2) including the center O(f) of the combustion chamber 6. In a variant shown in FIG. 16, the ignition promoting chamber 42 is arranged at the center O(f) of the combustion chamber 6. FIG. 17 is a diagram of the top surface 6a of the combustion chamber 6, viewed from the interior of the combustion chamber 6 shown in FIG. 16. As can be seen from FIG. 17, the ignition promoting chamber 42 is located at the center O(f) of the combustion chamber 6, with the four communication holes 44 being arranged on the first and second center lines CL(1) and CL(2), respectively, with the center O(f) of the combustion chamber 6 in between. In a variant shown in FIG. 16, the ignition promoting chamber 42 is formed by the cap member 114 separate from the cylinder 112, but it may be formed by the cap part 200 integrally molded with the cylinder 112. FIG. 16 represents a variant related to the top surface 4a of the piston 4. Although in the embodiment the top surface 4a of the piston 4 is a flat surface (FIG. 4), the top surface 4a of the piston 4 shown in FIG. 16 has a spherical shape that is convex upward.

Figure 18:
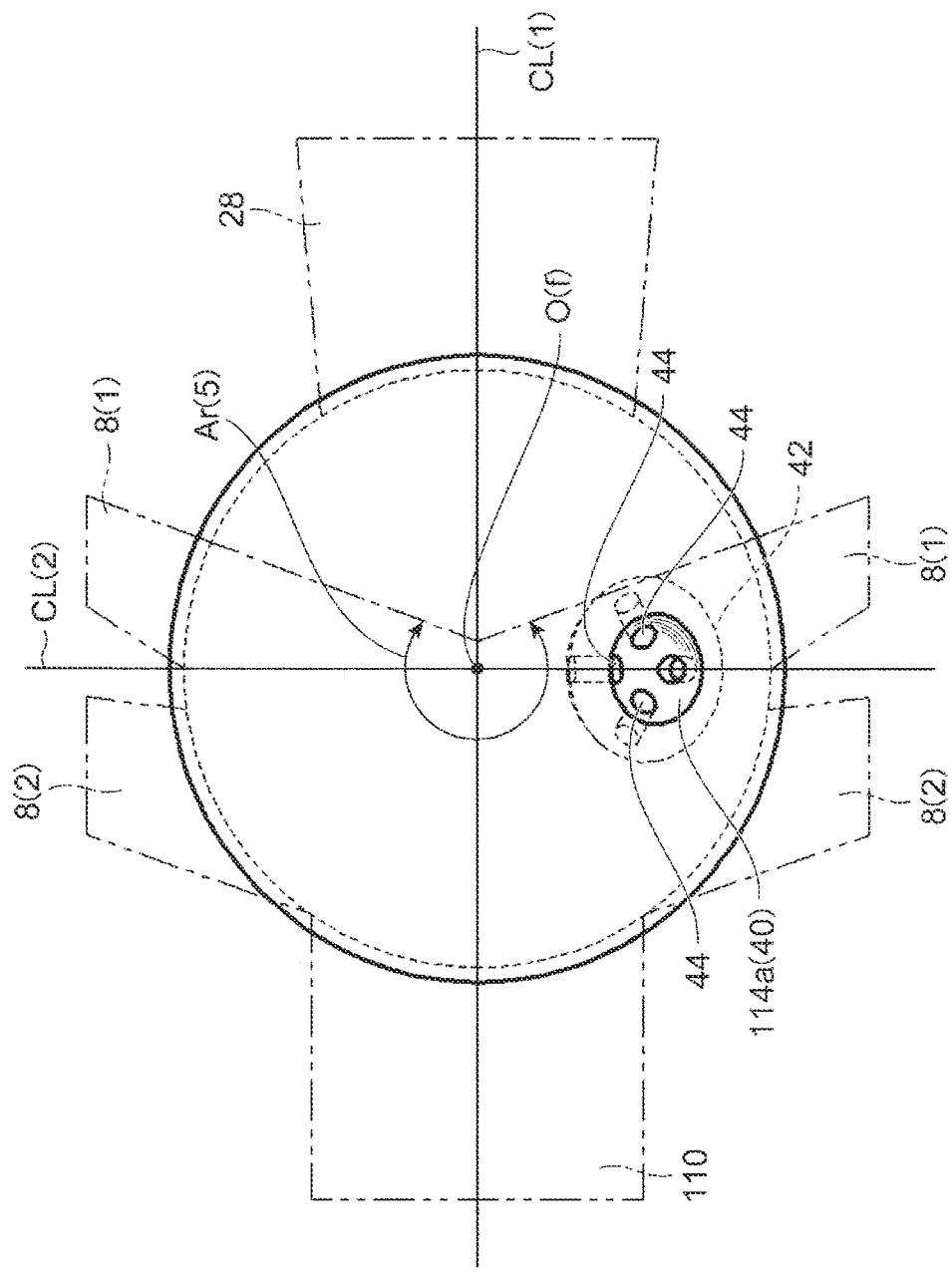
FIG. 18 shows a diagram of another variant related to the arrangement position of the ignition promoting chamber, with the ignition promoting chamber lying offset to one side of right and left sides across the first center line extending through an intake port, an exhaust port, and the center of the combustion chamber.
Figure 19:
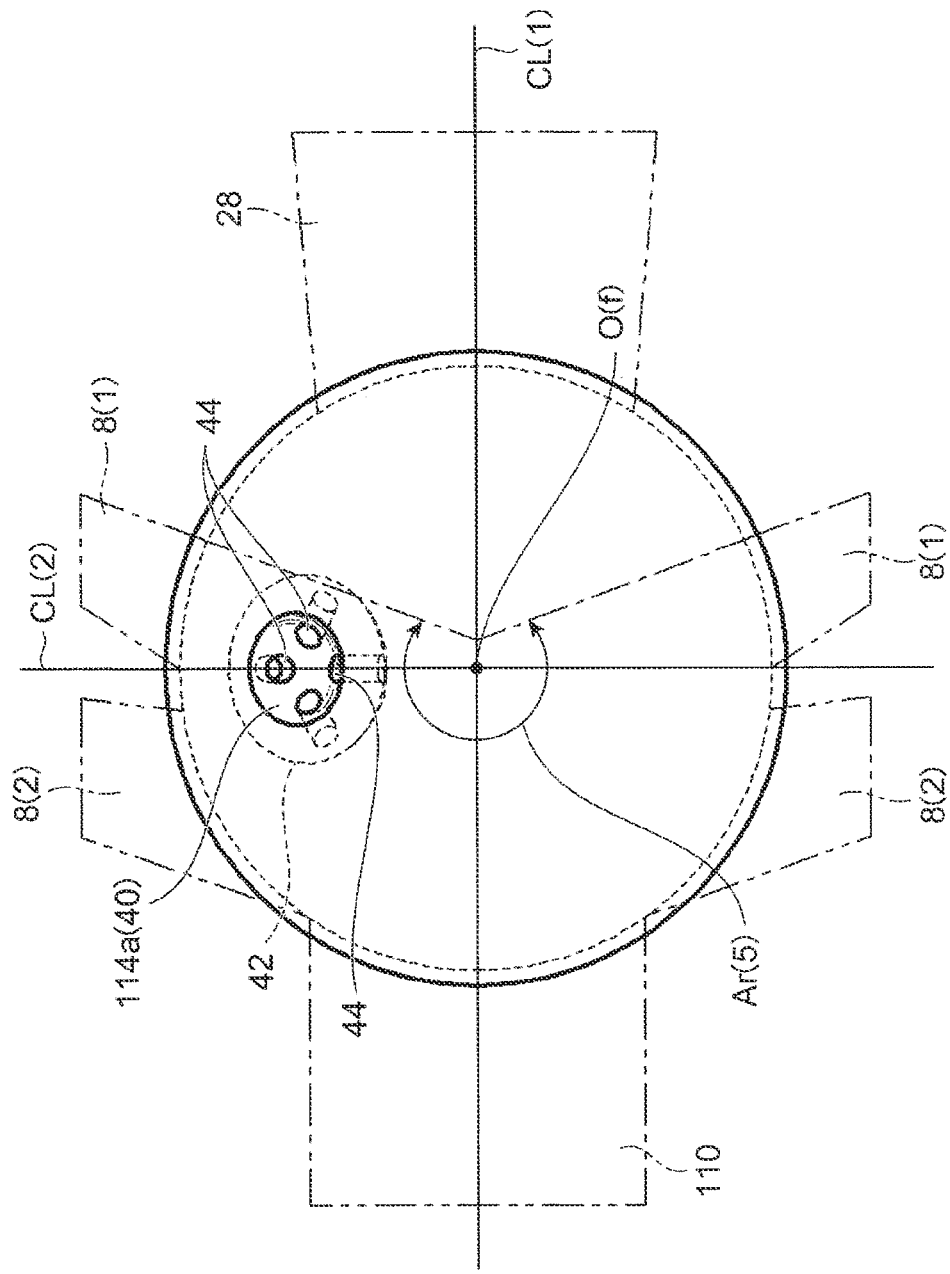
FIG. 19 shows a diagram for explaining that regarding the arrangement position of the ignition promoting chamber shown in FIG. 18, the ignition promoting chamber may be offset to the other side of the right and left sides across the first center line.

As regards the arrangement position of the ignition promoting chamber 42, as shown in FIGS. 18 and 19, the ignition promoting chamber 42 may be disposed at a position offset from the first center line CL(1) in the fifth top surface area Ar(5) that is enclosed by tangents, toward the exhaust port 28, of the main scavenging ports 8(1) and on the opposite side to the exhaust port 28. FIG. 18 shows a variant in which the ignition promoting chamber 42 is arranged offset to one side from the first center line CL(1) and on the second center line CL(2). FIG. 19 shows a variant in which the ignition promoting chamber 42 is arranged offset to the other side from the first center line CL(1) and on the second center line CL(2).

Figure 20:
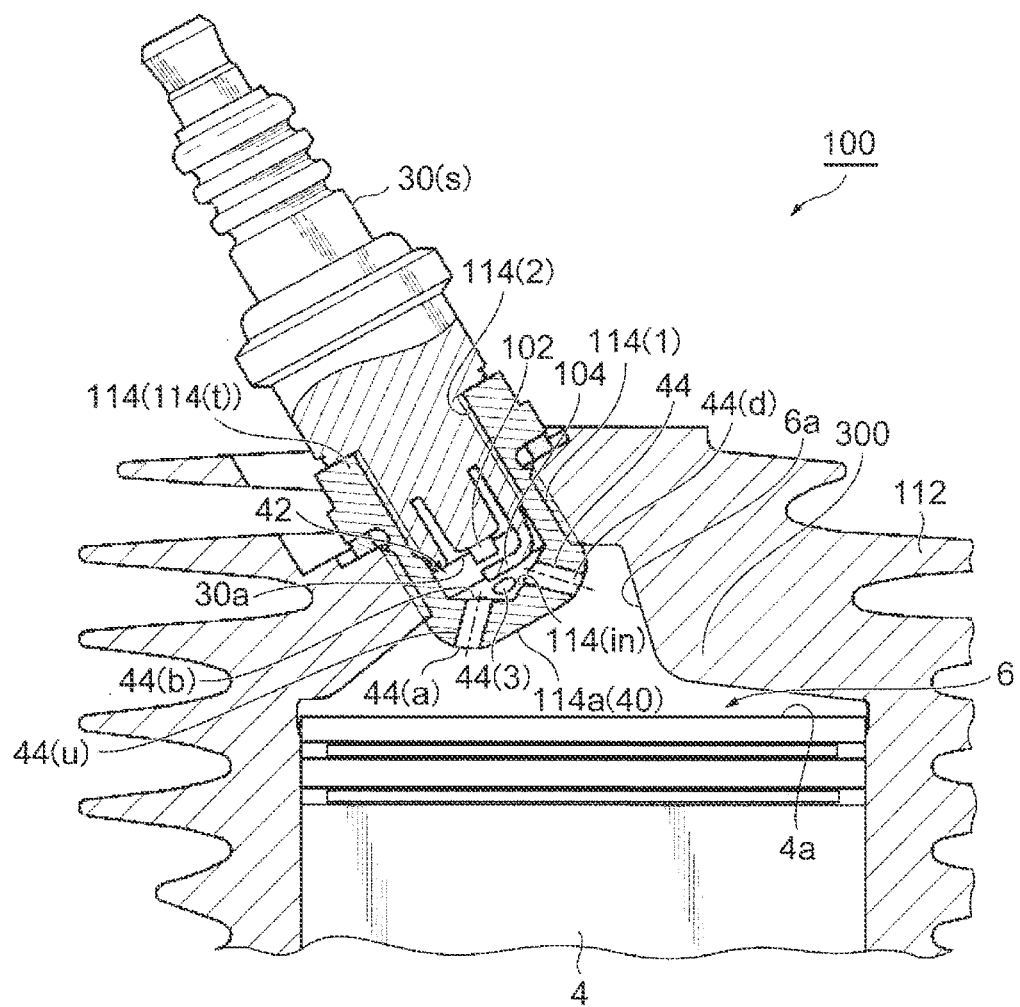
FIG. 20 shows a section view of the engine upper portion including a variant related to the top surface of the combustion chamber, in which in the top surface of the combustion chamber, a portion lying toward the exhaust port has a convex shape toward the combustion chamber.

FIG. 20 is a diagram showing a variant related to the top surface 6a of the combustion chamber 6. In the embodiment described above, the top surface 6a of the combustion chamber 6 has a conical shape, with the first and second top surface areas Ar(1) and Ar(2) being symmetrical with the third and fourth top surface areas Ar(3) and Ar(4) across the second center line CL(2) (FIG. 4). As shown in FIG. 20, in the top surface 6a of the combustion chamber 6, the first and second top surface areas Ar(1) and Ar(2) are asymmetrical with the third and fourth top surface areas Ar(3) and Ar(4), with the third and fourth top surface areas Ar(3) and Ar(4) located toward the exhaust port 28 having a shape convexed toward the combustion chamber 6 by a convex portion 300.

Figure 21:
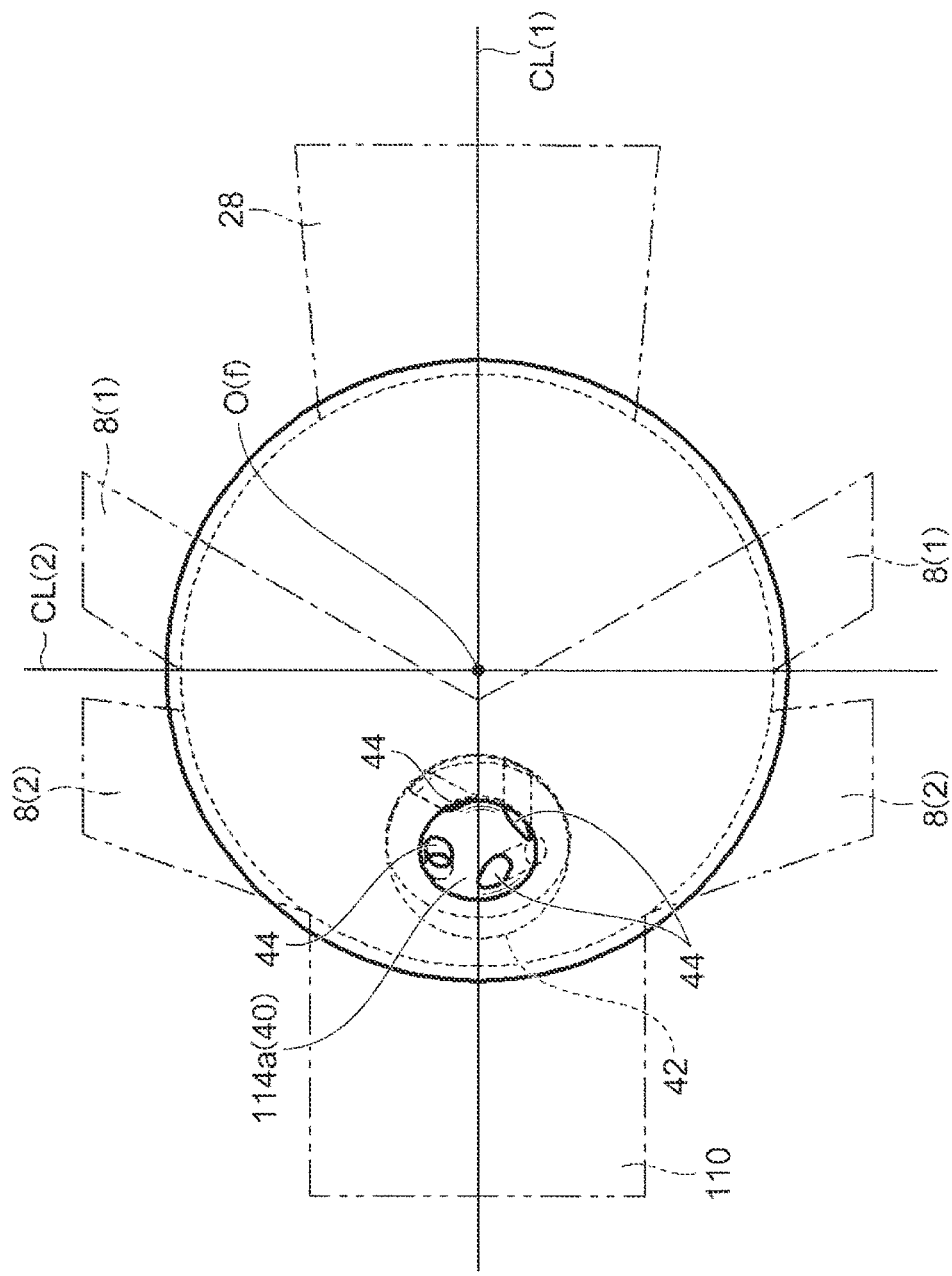
FIG. 21 shows a schematic explanatory view of the top surface of the combustion chamber, which is a diagram for explaining a variant in which the plurality of communication holes have passage shapes generating swirl.

FIGS. 21 to 26 show variants related to the passage shape of the plurality of communication holes 44. The above embodiment includes the four communication holes 44 whose axes intersect at the central electrode 102 of the spark plug 30(s) (FIGS. 4 and 5). In FIG. 21, the four communication holes 44 exemplarily have passage shapes that generate swirl inside the ignition promoting chamber 42. The swirl direction can be right or left. The communication holes 44 generating this swirl enable generation of swirl in the ignition promoting chamber 42 and flames erupting through the communication holes 44 enable generation of swirl in the combustion chamber 6 during the combustion stroke. This can make flame propagation uniform over the entire area of the combustion chamber 6.

Figure 22:
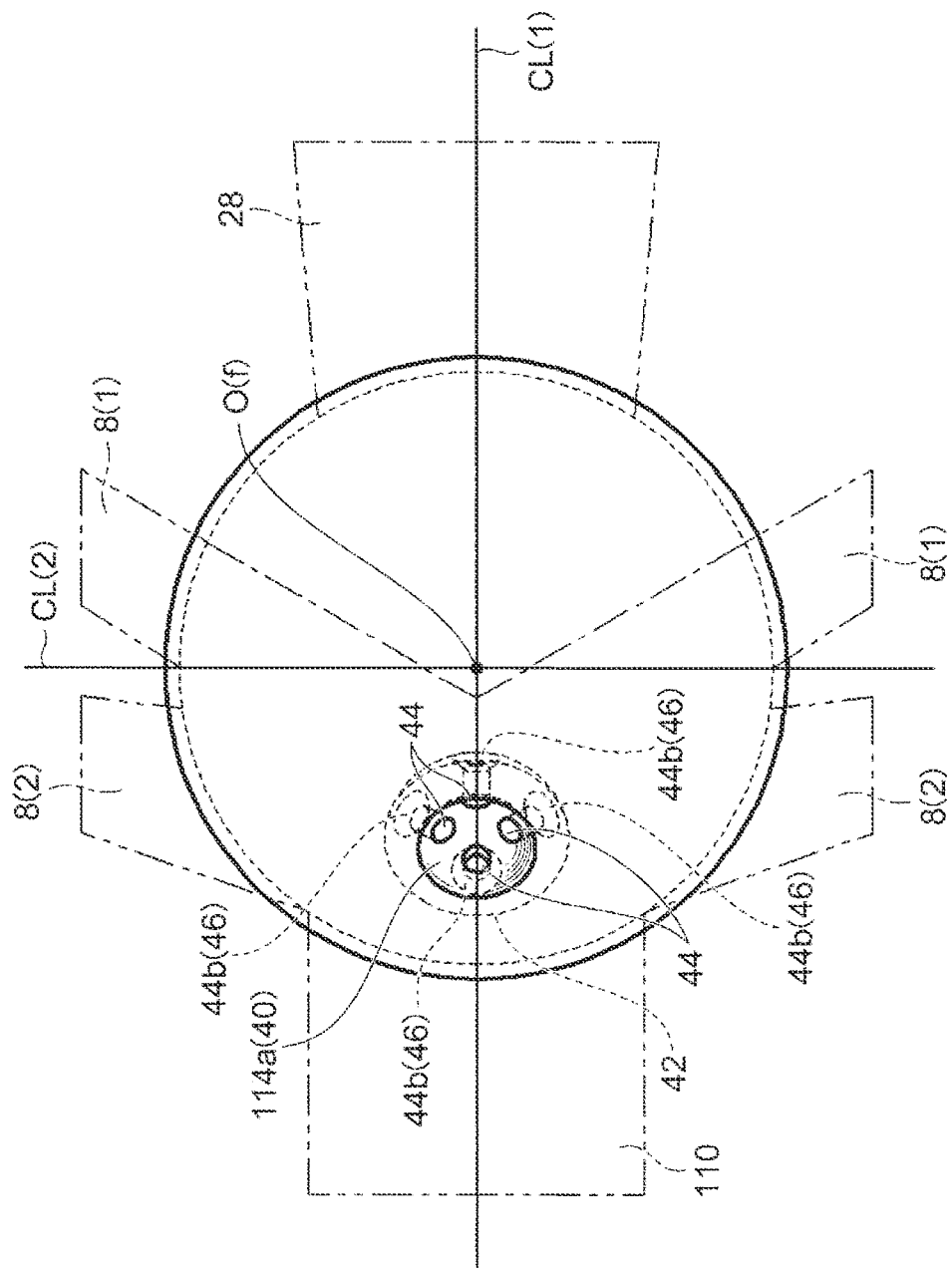
FIG. 22 shows a schematic explanatory view of the top surface of the combustion chamber, which is a diagram for explaining a variant in which chamfer is applied to a second opening, toward the ignition promoting chamber, of each communication hole.

FIG. 22 is a diagram for explaining that a chamfer 46 may be applied to the second opening 44b, toward the ignition promoting chamber 42, of each communication hole 44. Unless the chamfer 46 is applied to the second opening 44b, toward the ignition promoting chamber 42, of each communication hole 44, an edge portion of the second opening 44b may be overheated and abnormal combustion may occur at that portion. However, since there is no overheated part by virtue of applying the chamfer 46 to the second opening 44b of each communication hole 44, abnormal combustion can be avoided. Application of chamfer 46 to the second opening 44b of the communication holes 44 reduces the channel resistance from the combustion chamber 6 to the ignition promoting chamber 42, making it easier for the scavenging gas flow Sf containing air-fuel mixture to flow into the ignition promoting chamber 42. Furthermore, the jets of flames can be made stronger that are erupted from the ignition promoting chamber 42 through the communication holes 44 into the combustion chamber 6 in the combustion stroke. In FIG. 22, the second opening 44b, toward the ignition promoting chamber 42, of the communication holes 44 is given an opening diameter different from that of the first opening 44a toward the combustion chamber 6 by applying the chamfer 46 to the former, but the first opening 44a toward the combustion chamber 6 and the second opening 44b toward the ignition promoting chamber 42, of the communication holes 44 may have their respective optionally changed opening diameters. In other words, the openings of the communication holes 44 need not have the same shape and/or the same diameter, and the opening shape and the opening diameter of each of the communication holes 44 are set to optimum shape and diameter based on the specifications of the engine to which the present invention is applied.

Figure 23:
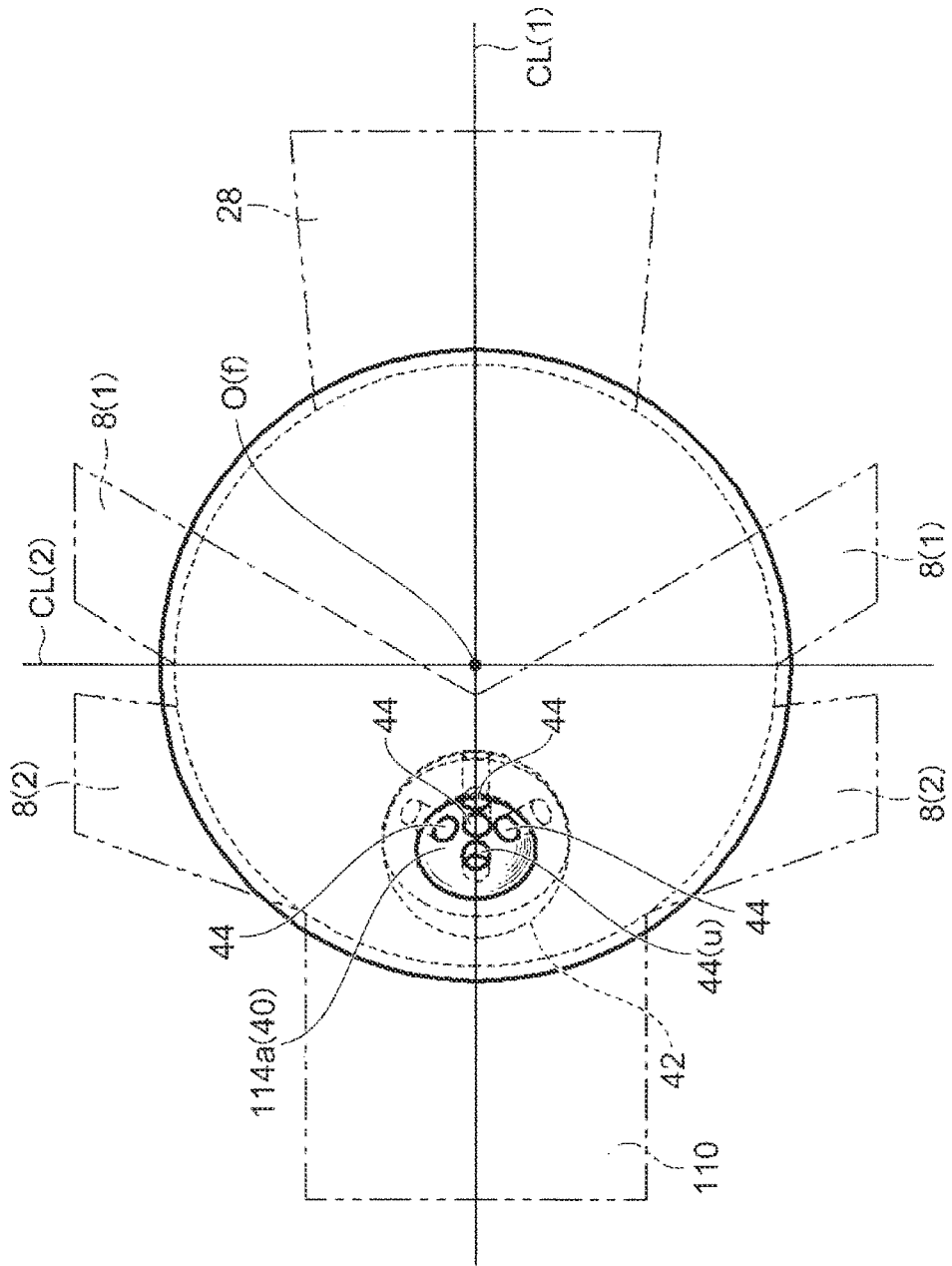
FIG. 23 shows a schematic explanatory view of the top surface of the combustion chamber, which is a diagram for explaining a variant having five communication holes.
Figure 24:
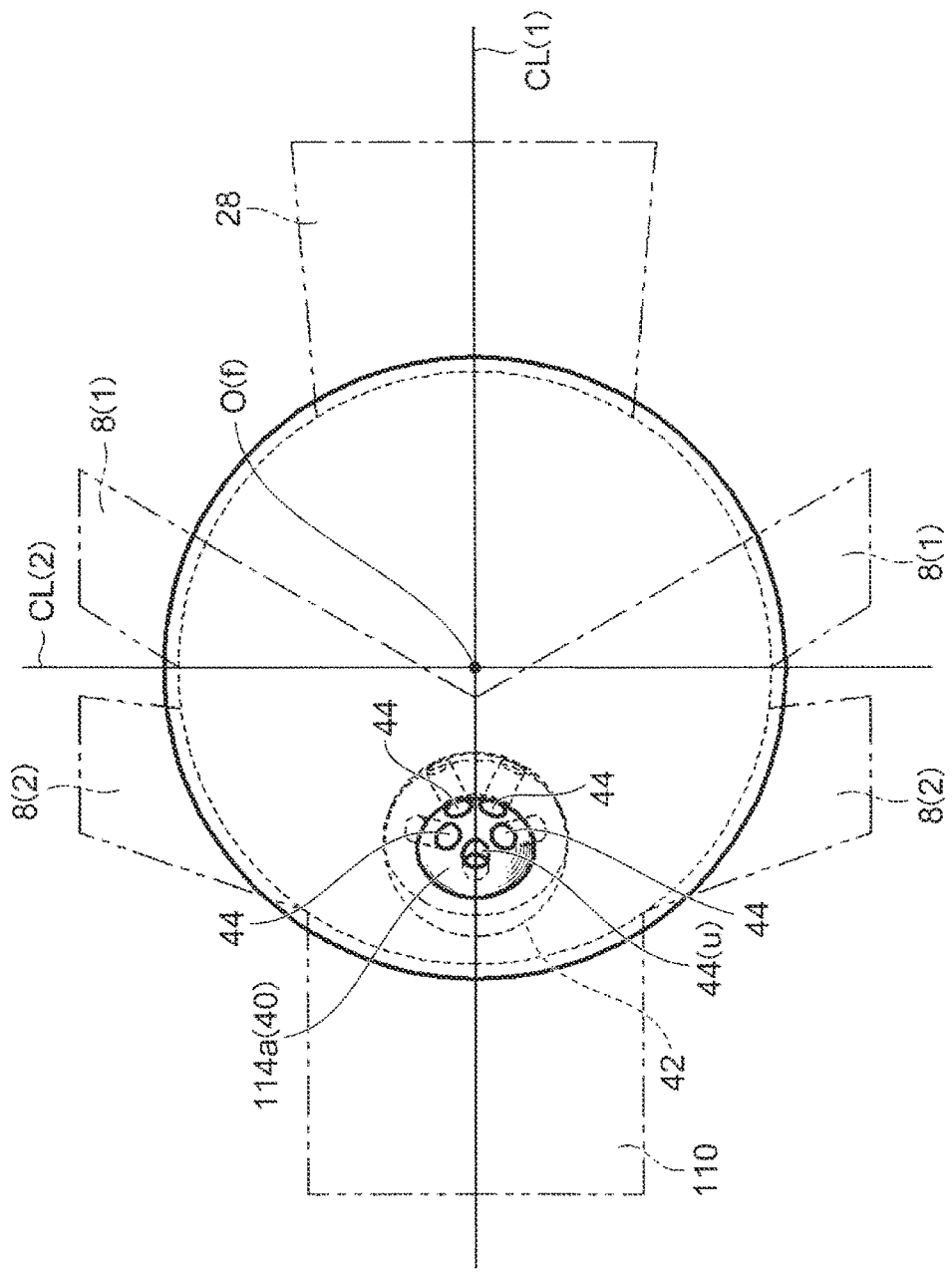
FIG. 24 shows a diagram for explaining a variant related to arrangement positions of the five communication holes disposed similar to FIG. 23.
Figure 25:
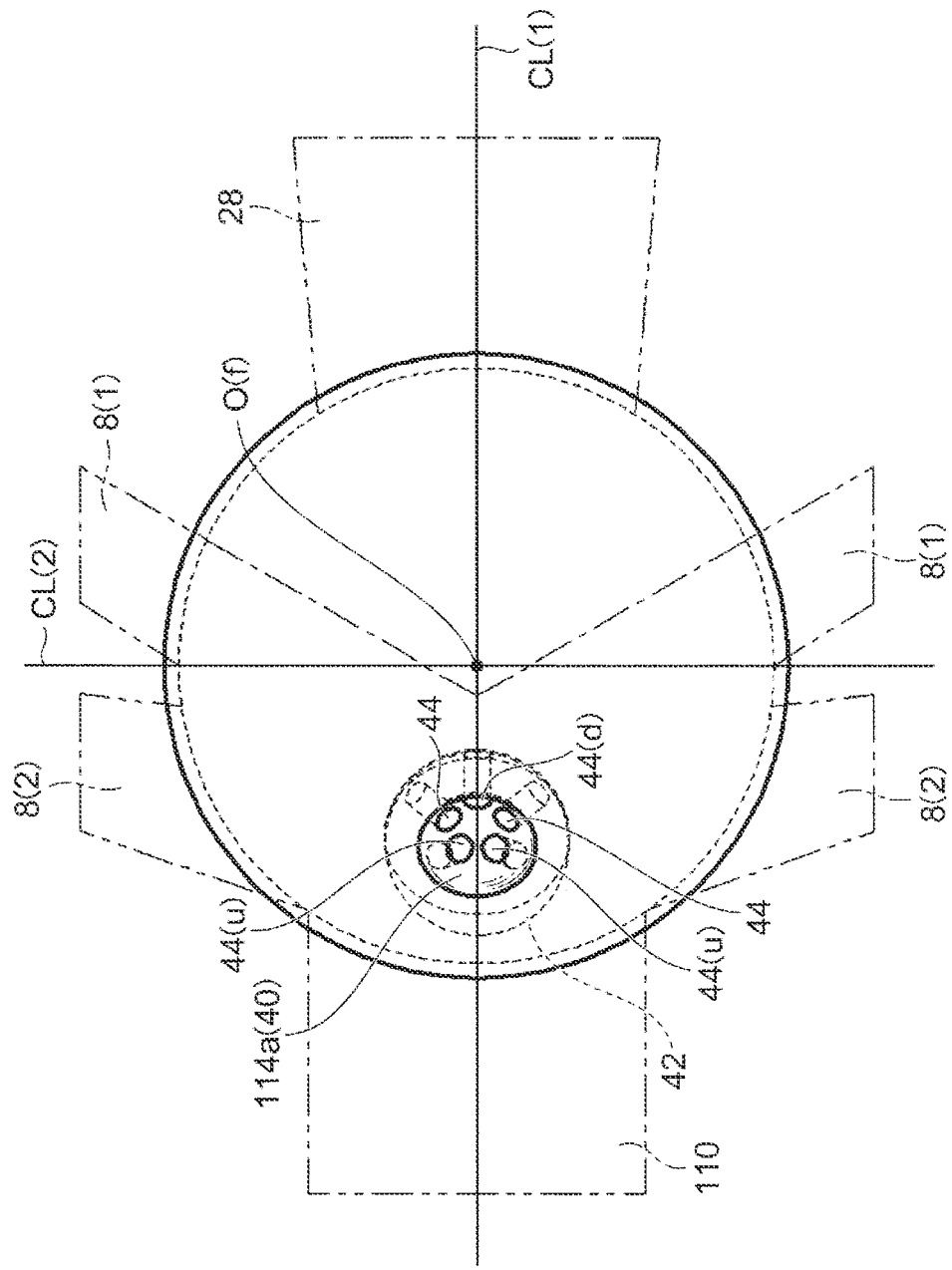
FIG. 25 shows a diagram for explaining another variant of the arrangement positions of the five communication holes, in relation to FIG. 24.
Figure 26:
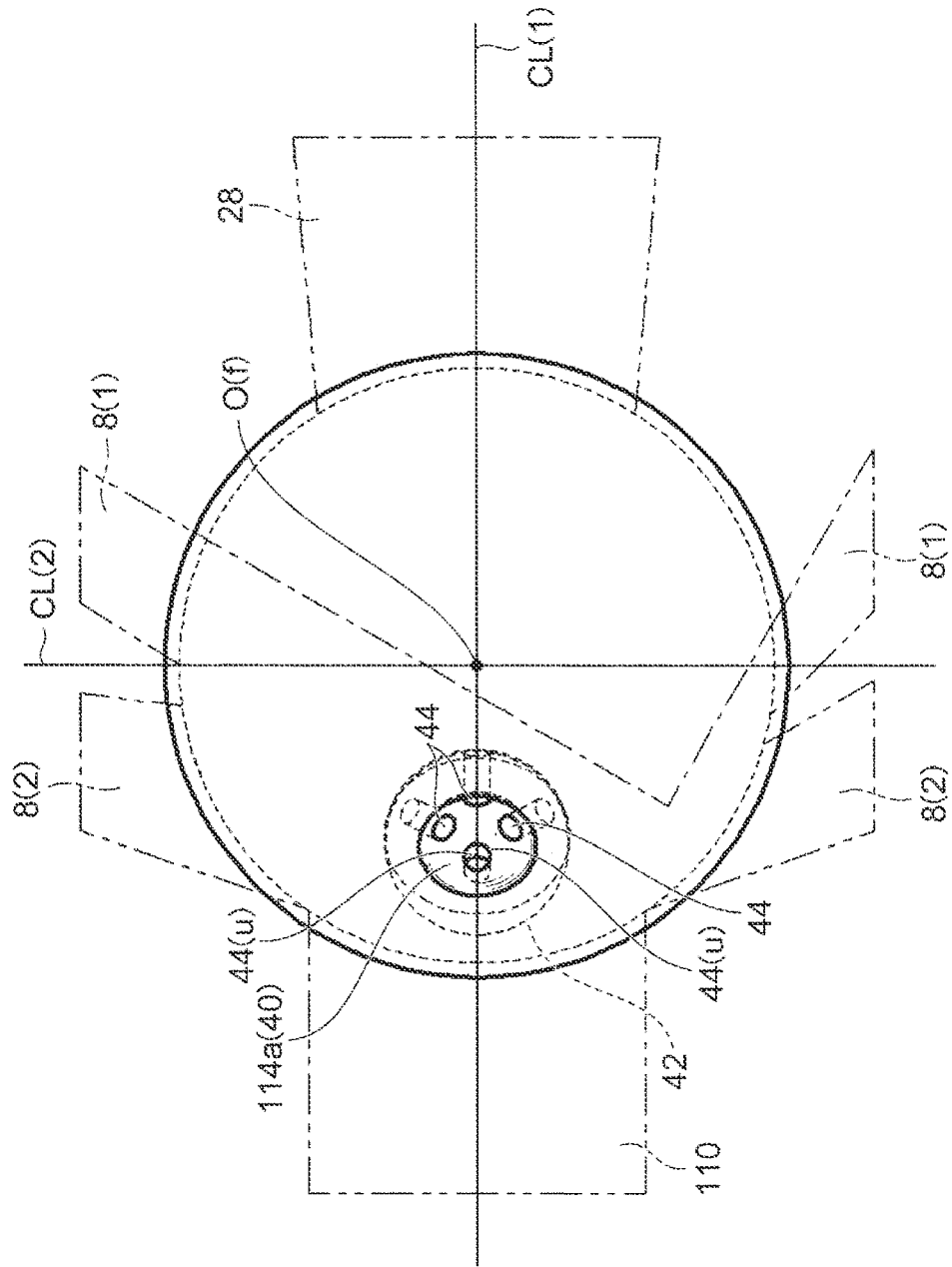
FIG. 26 shows a diagram for explaining that in the engine of the present invention the shapes of the scavenging ports lying on right and left sides and the orientation directions thereof may be bilaterally asymmetrical.

FIGS. 23 to 25 are diagrams for explaining that the number of the plurality of communication holes 44 is arbitrary and that the arrangement thereof is also arbitrary based on the specifications of the engine to which the present invention is applied. Although in the variants shown in FIGS. 23 to 25 the number of the communication holes 44 is five, this is mere exemplification and the number of the communication holes 44 is a matter of design. Although in the variants shown in FIGS. 23 to 25 the ignition promoting chamber 42 is formed by the cap member 114, it may be formed by the cap part 200 integrally molded with the cylinder 112.

In FIG. 23, five communication holes 44 are arranged such that one lies at the center of the closed end portion 114a of the cap member 114, with remaining four communication holes 44 being arranged at equal intervals around the one communication hole 44. The shown example has a communication hole 44(u) arranged at a position where the scavenging gas flows Sf (FIG. 2) meet and gather in a bundle. The five communication holes 44 shown in FIG. 23 have passage shapes that allow the axes of the communication holes 44 to intersect at the central electrode 102 of the spark plug 30(s).

Five communication holes 44 shown in FIG. 24 are arranged at equal intervals around the center of the closed end portion 114a of the cap member 114. One communication hole 44(u) is arranged at a position where the scavenging gas flows Sf (FIG. 2) merge together and gather in a bundle.

Five communication holes 44 shown in FIG. 25 are the same as the variant shown in FIG. 24 in that they are arranged at equal intervals around the center of the closed end portion 114a of the cap member 114, but one communication hole 44 is arranged downstream of the scavenging gas flows Sf (FIG. 2). The other four communication holes 44 are respectively oriented and arranged toward two pairs of scavenging ports 8 so as to receive the scavenging gas flows Sf.

Although not shown, a passage form generating swirl may be configured by imparting a different opening diameter to each of the five communication holes 44 shown in FIGS. 24 and 25. In this case, the passage shape may be such that the axes of the communication holes 44 intersect at the central electrode 102 of the spark plug 30(s). The communication holes 44 generating swirl enables swirl to occur in the ignition promoting chamber 42, and flames erupted through the communication holes 44 can generate swirl in the combustion chamber 6 during the combustion stroke. As a result, flame propagation can be made uniform over the entire areas of the combustion chamber 6.

In the above embodiment, the scavenging ports 8 lying on the right and left sides across the first center line CL(1) have bilaterally symmetrical shapes. As can immediately be understood from FIG. 26, the passage shapes and their orientation directions of the scavenging ports 8 may be bilaterally asymmetrical. The arrangement of the communication holes 44 and the passage shape are optimized so as to be adapted to the bilaterally asymmetric scavenging ports.

Although the embodiment of the present invention and the various modifications of elements included in the embodiment have hereinbefore been set forth, it is natural that these can optionally be combined.

EXPLANATIONS OF LETTERS OR NUMERALS 2 two-stroke engine according to the present invention
2(n) engine body of standard scavenging type of FIG. 1
2(s) engine body of stratified scavenging type of FIG. 2
4 piston
6 combustion chamber
8 scavenging port
8(1) main scavenging port
8(2) second scavenging port
8(3) booster port
Sf scavenging gas flow
10 scavenging passage
12 crankcase
28 exhaust port
30 ignition device
30a tip end portion of ignition device
30(s) spark plug
40 separating wall that forms ignition promoting chamber
42 ignition promoting chamber
44 communication holes of separating wall
100 two-stroke engine of embodiment
102 plug central electrode (that forms local hot spot)
106 gas pocket (that forms local hot spot)
110 intake port
112 cylinder
114 cap member
114(t) tubular portion of cap member
114(1) first threaded portion (via which cap member is fitted to cylinder)
114(2) second threaded portion (via which spark plug is fitted)
114a closed end portion (that constitutes separating wall) of cap member
200 cap member integrally molded with cylinder
200(t) tubular portion of cap part
200a closed end portion (that constitutes separating wall) of cap part

What is claimed is:

1. A two-stroke engine having:
an ignition device;
a combustion chamber defined by a piston;
a scavenging port opening into the combustion chamber, the scavenging port opened and closed by the piston; and
a scavenging passage allowing the combustion chamber to communicate through the scavenging port with a crankcase,
in a scavenging stroke, intake gas pre-compressed in the crankcase being supplied through the scavenging port to the combustion chamber to generate a scavenging gas flow inside the combustion chamber, the scavenging gas flow squeezing burnt gas within the combustion chamber into an exhaust port, for exhaust, the two-stroke engine comprising:
a separating wall confining a tip end portion of the ignition device;
an ignition promoting chamber formed by the separating wall, the ignition promoting chamber independent of the combustion chamber and enclosing the tip end portion of the ignition device; and a plurality of communication holes disposed in the separating wall, each having a first opening that opens into the combustion chamber and a second opening that opens into the ignition promoting chamber, to allow the combustion chamber and the ignition promoting chamber to communicate with each other, wherein the ignition promoting chamber is arranged at a position where the scavenging gas flow has a relatively high flow velocity and/or a relatively high flow rate.

2. The two-stroke engine of claim 1, wherein at least one of the plurality of communication holes is opened to a direction accepting the scavenging gas flow formed in the combustion chamber during the scavenging stroke.

3. The two-stroke engine of claim 2, wherein at least one of the plurality of communication holes is directed toward a local hot spot at a tip end portion of the ignition device.

4. The two-stroke engine of claim 3, wherein the plurality of communication holes have their respective axes that intersect at a single point, with flames erupted from the plurality of communication holes diffusing into the combustion chamber in a flared manner.

5. The two-stroke engine of claim 1, wherein at least one of the plurality of communication holes is opened to a direction in which a flame is carried by the scavenging gas flow when the flame is erupted from the combustion chamber in a combustion stroke.

6. The two-stroke engine of claim 1, wherein the scavenging gas flow is an upward flow toward a direction away from the exhaust port.

7. The two-stroke engine of claim 1, wherein the scavenging port comprises:

a main scavenging port; and a second scavenging port adjacent to the main scavenging port and lying away from the exhaust port.

8. The two-stroke engine of claim 1, wherein the scavenging port further comprises:

a booster port lying opposite to the exhaust port, for directing the scavenging gas flow upward.

9. The two-stroke engine of claim 1, wherein the ignition promoting chamber is arranged at a center of the combustion chamber.

10. The two-stroke engine of claim 1, wherein the number of the plurality of communication holes is at least two.

11. The two-stroke engine of claim 1, comprising:

a bottomed cylindrical cap part integrally molded with a cylinder of the engine, the cap part having a closed end portion that constitutes the separating wall, wherein the ignition device is screwed to a cylindrical portion of the cap part.

12. The two-stroke engine of claim 1, comprising:

a bottomed cylindrical cap member that is a member separate from a cylinder of the engine, the cap member having a closed end portion that constitutes the separating wall.

13. The two-stroke engine of claim 12, wherein the cap member constitutes part of the ignition device.

* * * * *